(12) United States Patent
Murata

(10) Patent No.: US 9,840,250 B2
(45) Date of Patent: Dec. 12, 2017

(54) VEHICLE DRIVE APPARATUS

(71) Applicant: Kiyohito Murata, Susono (JP)

(72) Inventor: Kiyohito Murata, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 198 days.

(21) Appl. No.: 14/765,634

(22) PCT Filed: Feb. 8, 2013

(86) PCT No.: PCT/JP2013/053145
§ 371 (c)(1),
(2) Date: Aug. 4, 2015

(87) PCT Pub. No.: WO2014/122787
PCT Pub. Date: Aug. 14, 2014

(65) Prior Publication Data
US 2015/0367839 A1   Dec. 24, 2015

(51) Int. Cl.
*F16H 1/28* (2006.01)
*B60K 6/22* (2007.10)
(Continued)

(52) U.S. Cl.
CPC .......... *B60W 20/1084* (2013.01); *B60K 6/22* (2013.01); *B60K 6/26* (2013.01); *B60K 6/445* (2013.01); *B60K 11/02* (2013.01); *B60L 3/0023* (2013.01); *B60L 7/14* (2013.01); *B60L 11/123* (2013.01); *B60L 11/14* (2013.01); *B60L 15/2009* (2013.01); *B60L 15/2054* (2013.01); *B60W 20/10* (2013.01); *B60W 20/17* (2016.01); *F16H 1/28* (2013.01); *F16H 3/727* (2013.01); *F16H 48/08* (2013.01); *H02K 7/003* (2013.01); *H02K 7/116* (2013.01); *B60L 2210/40* (2013.01); *B60L 2220/14* (2013.01); *B60L 2220/50* (2013.01); *B60L 2240/12* (2013.01);
(Continued)

(58) Field of Classification Search
None
See application file for complete search history.

(56) References Cited

U.S. PATENT DOCUMENTS 3,175,110 A * 3/1965 Kohlhagen ............ G04C 15/00
                                                   310/164
4,425,813 A * 1/1984 Wadensten ............ F16F 15/124
                                                   248/635
(Continued)

FOREIGN PATENT DOCUMENTS

JP    S57-163182 U    10/1982
JP    H08-182234 A    7/1996
(Continued)

*Primary Examiner* — Justin Holmes
(74) *Attorney, Agent, or Firm* — Andrews Kurth Kenyon LLP

(57) ABSTRACT

A vehicle drive apparatus includes: an engine; a rotary machine; an output member coupled to a drive wheel of a vehicle; a differential mechanism configured to couple the engine, the rotary machine, and the output member together to be differentially rotatable via a plurality of differentially rotatable rotational elements; and an elastic member configured to couple a rotation shaft of the rotary machine to the rotational element of the differential mechanism to be relatively rotatable.

12 Claims, 17 Drawing Sheets

(51) Int. Cl.
*B60W 20/00* (2016.01)
*H02K 7/00* (2006.01)
*H02K 7/116* (2006.01)
*B60K 6/26* (2007.10)
*B60K 6/445* (2007.10)
*B60L 3/00* (2006.01)
*B60L 7/14* (2006.01)
*B60L 11/12* (2006.01)
*B60L 11/14* (2006.01)
*B60L 15/20* (2006.01)
*B60K 11/02* (2006.01)
*B60W 20/10* (2016.01)
*F16H 48/08* (2006.01)
*B60W 20/17* (2016.01)
*F16H 3/72* (2006.01)
*F16H 37/08* (2006.01)

(52) U.S. Cl.
CPC ..... *B60L 2240/36* (2013.01); *B60L 2240/421* (2013.01); *B60L 2240/423* (2013.01); *B60L 2240/441* (2013.01); *B60L 2240/443* (2013.01); *B60L 2240/445* (2013.01); *B60L 2240/486* (2013.01); *B60L 2270/142* (2013.01); *B60L 2270/145* (2013.01); *B60Y 2300/58* (2013.01); *B60Y 2400/48* (2013.01); *F16H 3/724* (2013.01); *F16H 2037/0866* (2013.01); *F16H 2048/085* (2013.01); *F16H 2200/2007* (2013.01); *F16H 2200/2097* (2013.01); *Y02T 10/6217* (2013.01); *Y02T 10/6239* (2013.01); *Y02T 10/641* (2013.01); *Y02T 10/645* (2013.01); *Y02T 10/7077* (2013.01); *Y02T 10/7241* (2013.01); *Y02T 10/7275* (2013.01); *Y10S 903/902* (2013.01)

(56) References Cited

U.S. PATENT DOCUMENTS

| | | | | |
|---|---|---|---|---|
| 4,587,863 A * | 5/1986 | Wadensten | ................ | B06B 1/16 248/638 |
| 5,354,182 A * | 10/1994 | Niemiec | ................ | F01C 21/007 248/638 |
| 5,761,850 A * | 6/1998 | Lhotak | ................ | H02K 5/24 464/180 |
| 5,967,940 A | 10/1999 | Yamaguchi | | |
| 2007/0049456 A1 * | 3/2007 | Shimizu | ................ | B60K 6/44 477/3 |
| 2007/0201308 A1 * | 8/2007 | Wassermann | ........ | G01V 11/002 367/82 |
| 2008/0023238 A1 * | 1/2008 | Shimizu | ................ | B60K 6/365 180/65.265 |
| 2009/0005923 A1 * | 1/2009 | Shimizu | ................ | B60K 6/445 701/22 |
| 2009/0043465 A1 * | 2/2009 | Tomita | ................ | B60K 6/40 701/51 |
| 2013/0297180 A1 | 11/2013 | Ando et al. | | |

FOREIGN PATENT DOCUMENTS

| | | |
|---|---|---|
| JP | H11-093725 A | 4/1999 |
| JP | 2005-199942 A | 7/2005 |
| JP | 2006-333538 A | 12/2006 |
| JP | 2008-114817 A | 5/2008 |
| JP | 2008-253004 A | 10/2008 |
| JP | 2010-083387 A | 4/2010 |
| JP | 2012-081886 A | 4/2012 |
| WO | 2012/095952 A1 | 7/2012 |

* cited by examiner

VEHICLE DRIVE APPARATUS

CROSS-REFERENCE TO RELATED APPLICATION

This is a national phase application based on the PCT International Patent Application No. PCT/JP2013/053145 filed Feb. 8, 2013, the entire contents of which are incorporated herein by reference.

FIELD

The present invention relates to a vehicle drive apparatus.

BACKGROUND

As a vehicle drive apparatus to be mounted on a vehicle, for example, Patent Literature 1 discloses a vehicle drive apparatus that includes a plurality of planetary gear mechanisms and is applied to a hybrid vehicle, which includes both an internal combustion engine and an electric motor as power sources for running.

CITATION LIST

Patent Literature

Patent Literature 1: Japanese Laid-open Patent Publication No. 2012-81886

SUMMARY

Technical Problem

Incidentally, the above-described vehicle drive apparatus described in Patent Literature 1 has room for further improvement in, for example, suppression of sound noise (or vibration).

The present invention has been made in view of the above-described circumstances, and it is an object of the present invention to provide a vehicle drive apparatus that allows suppressing the occurrence of sound noise.

Solution to Problem

To achieve the above-described object, a vehicle drive apparatus according to the present invention includes: an engine; a rotary machine; an output member coupled to a drive wheel of a vehicle; a differential mechanism configured to couple the engine, the rotary machine, and the output member together to be differentially rotatable via a plurality of differentially rotatable rotational elements; and an elastic member configured to couple a rotation shaft of the rotary machine to the rotational element of the differential mechanism to be relatively rotatable.

The vehicle drive apparatus may include a control device configured to execute a torque control that controls the rotary machine to cause the rotary machine to output a pressing torque reducing a gap in an engaging portion between the plurality of rotational elements.

In the vehicle drive apparatus, the elastic member may be disposed within the rotation shaft of the rotary machine.

The vehicle drive apparatus may include a holding mechanism including: a rotation-shaft-side rotating member disposed within the rotation shaft of the rotary machine and configured to rotate integrally with the rotation shaft; and a rotational-element-side rotating member disposed within the rotation shaft of the rotary machine and configured to rotate integrally with the rotational element of the differential mechanism. The holding mechanism holds the elastic member between the rotation-shaft-side rotating member and the rotational-element-side rotating member. The rotation-shaft-side rotating member and the rotational-element-side rotating member are relatively rotatable within a range of a torsion angle that allows a required range corresponding to an output variation in the engine.

In the vehicle drive apparatus, the rotation-shaft-side rotating member may be formed in a pipe shape. The rotational-element-side rotating member may be formed in a plate shape and may be inserted into the rotation-shaft-side rotating member. The elastic member may be constituted by a wave-shaped leaf spring and may be interposed between an inner surface of the rotation-shaft-side rotating member and an outer surface of the rotational-element-side rotating member.

In the vehicle drive apparatus, the rotational-element-side rotating member may be formed in a rod shape and may include one end portion having a rotational-element-side engaging groove. The rotation-shaft-side rotating member may be formed on another end portion side of the rotational-element-side rotating member and may include a rotation-shaft-side engaging groove. The elastic member may be constituted by a coil spring and may be configured to allow insertion of the rotational-element-side rotating member on an inner side of the elastic member. The elastic member may include one end engaged with the rotational-element-side engaging groove and another end engaged with the rotation-shaft-side engaging groove.

The vehicle drive apparatus may include a hitting-sound detecting device configured to detect occurrence of hitting sound in the engaging portion between the plurality of rotational elements. The control device is configured to change the pressing torque based on a detection result by the hitting-sound detecting device.

The vehicle drive apparatus may include a temperature detecting device configured to detect a temperature of a cooling medium for cooling the engine. The control device is configured to change the pressing torque based on a detected temperature of the cooling medium by the temperature detecting device.

In the vehicle drive apparatus, the differential mechanism may include a first planetary gear mechanism and a second planetary gear mechanism. The rotary machine may couple to the engine via the first planetary gear mechanism and the second planetary gear mechanism and may receive a reactive force of a rotating power generated by the engine when the rotating power of the engine transmits to the drive wheel.

Advantageous Effects of Invention

The vehicle drive apparatus according to the present invention provides an advantageous effect that allows suppressing the occurrence of sound noise.

DESCRIPTION OF EMBODIMENTS

The following describes embodiments according to the present invention with reference to the drawings. Note that the present invention is not limited to these embodiments. Also, the components of the embodiments described below encompass components that can be easily replaced by a person skilled in the art or components that are substantially identical.

First Embodiment

Figure 1:
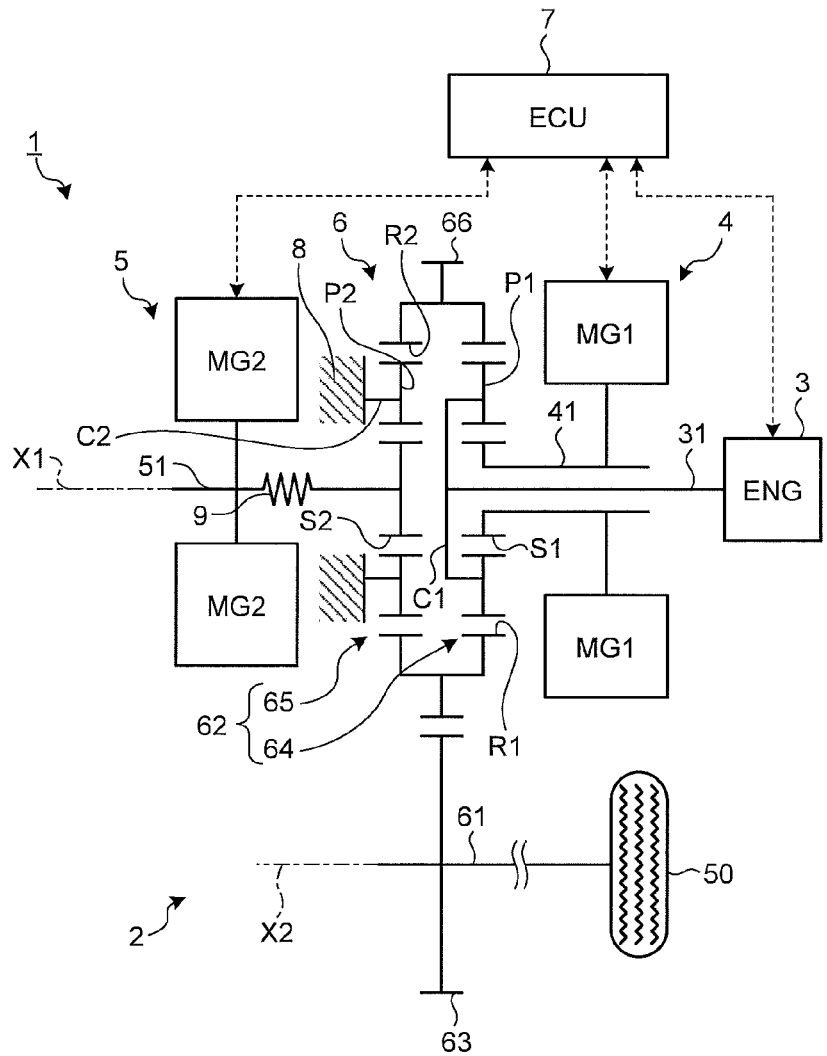
FIG. 1 is a schematic configuration diagram of a vehicle equipped with a vehicle drive apparatus according to a first embodiment.
Figure 6:
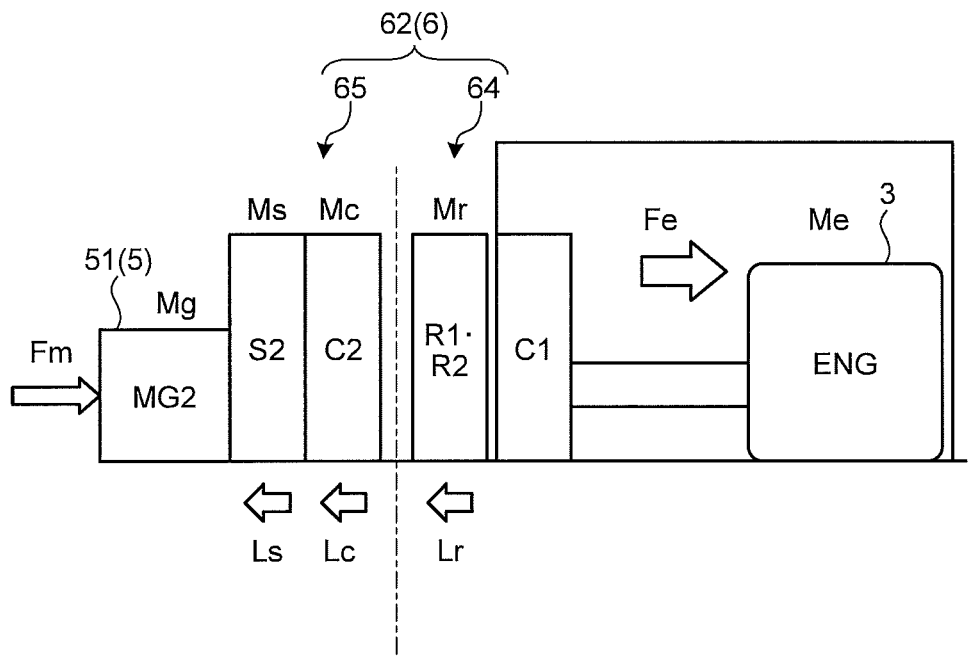
FIG. 6 is a schematic diagram describing estimation of rattling-noise occurrence positions.
Figure 7:
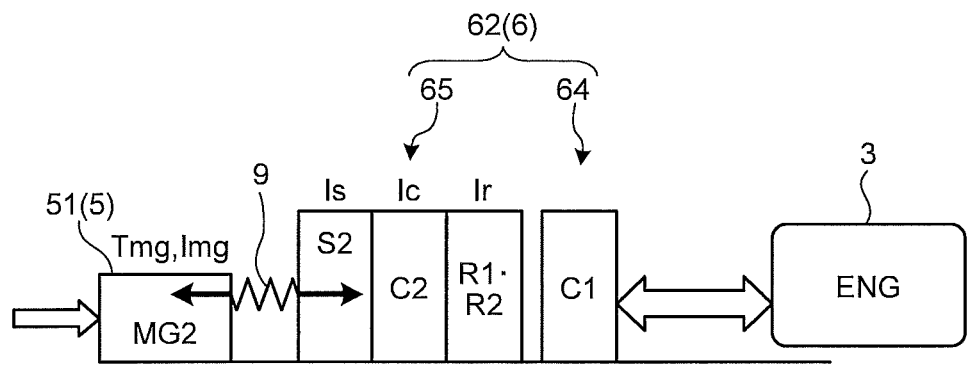
FIG. 7 is a schematic diagram illustrating the rotational elements between the engine and a second rotary machine according to the vehicle drive apparatus according to the first embodiment as a linear model.
Figure 8:
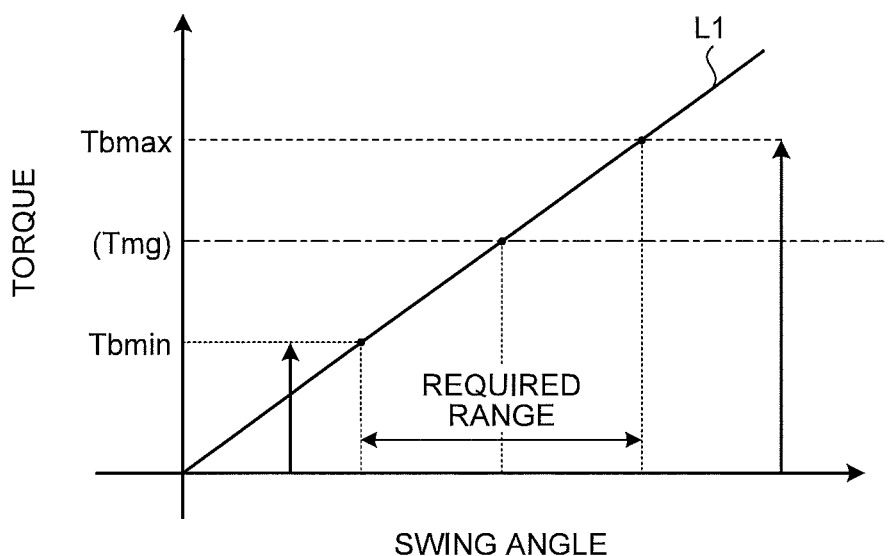
FIG. 8 is a graph describing one example of the operation of the vehicle drive apparatus according to the first embodiment.
Figure 9:
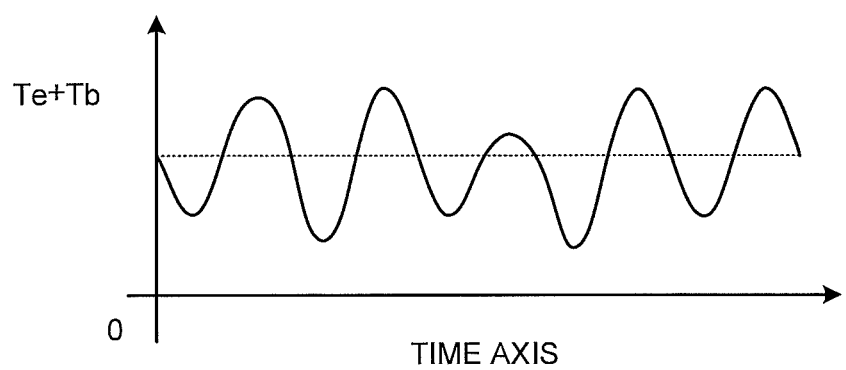
FIG. 9 is a timing chart chronologically illustrating the transition of the sum of an engine torque and a pressing-torque effective value in the vehicle drive apparatus according to the first embodiment.
Figure 10:
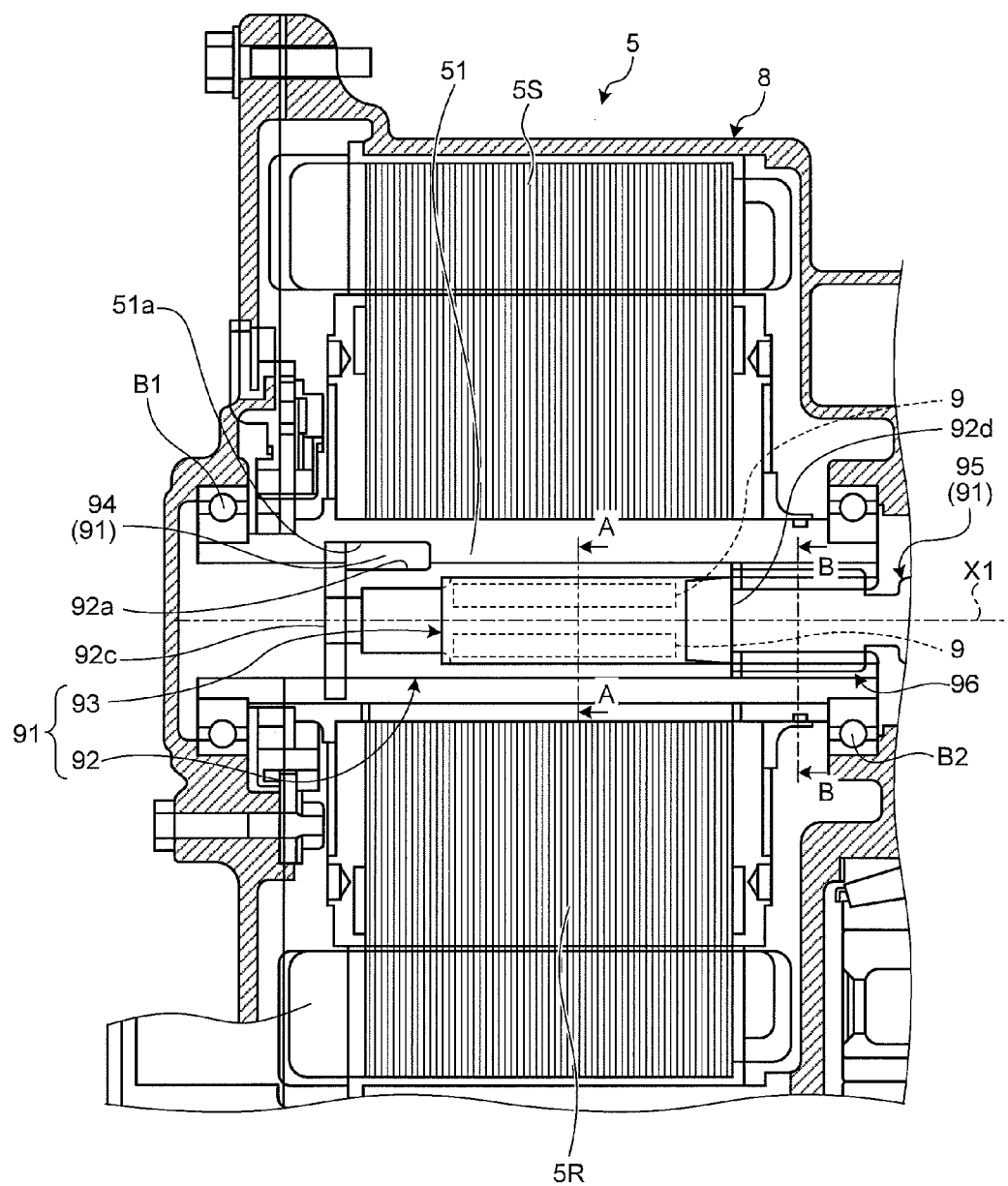
FIG. 10 is a partial cross-sectional view, including a holding mechanism, of the vehicle drive apparatus according to the first embodiment.
Figure 11:
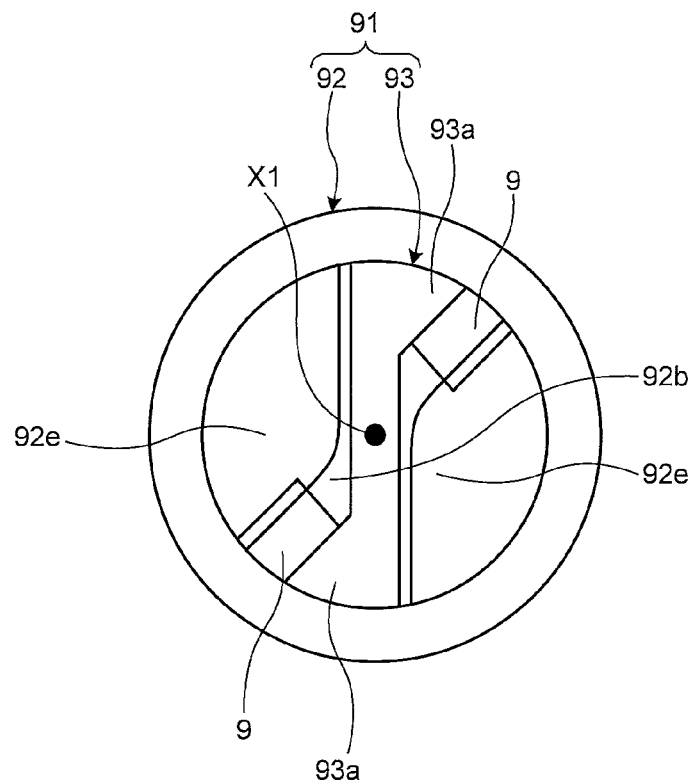
FIG. 11 is a cross-sectional view (an A-A cross-sectional view of FIG. 10) of the holding mechanism of the vehicle drive apparatus according to the first embodiment.
Figure 12:
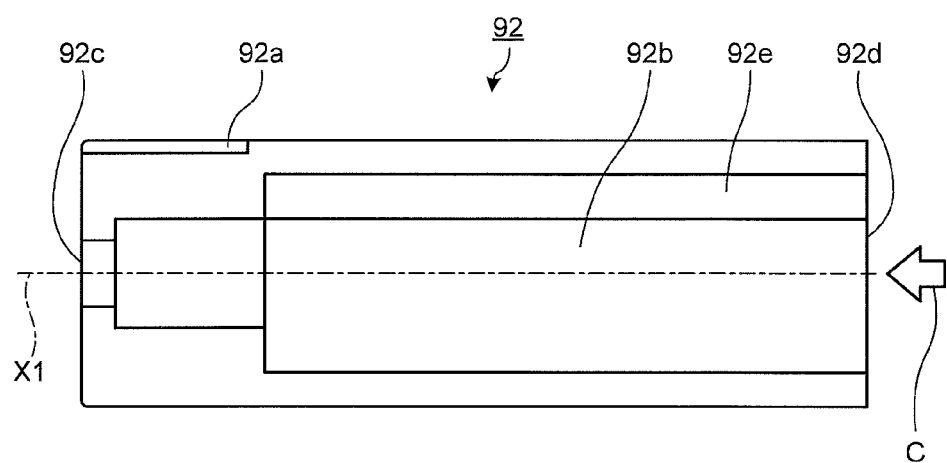
FIG. 12 is a cross-sectional view (a cross-sectional view along a rotation axis line X1) of a sleeve of the vehicle drive apparatus according to the first embodiment.
Figure 13:
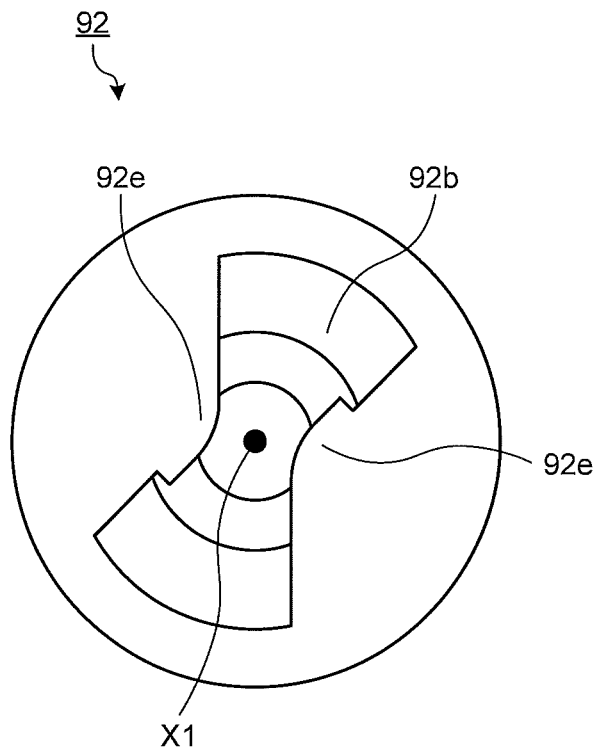
FIG. 13 is a C direction arrow view of FIG. 12.
Figure 14:
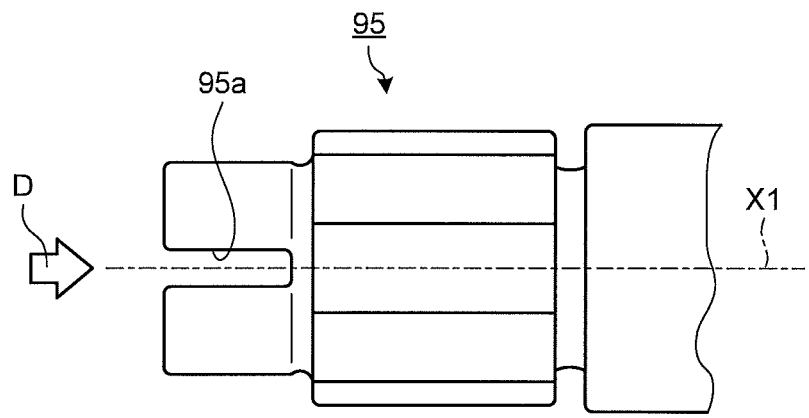
FIG. 14 is a partial side view of a coupling shaft of the vehicle drive apparatus according to the first embodiment.
Figure 15:
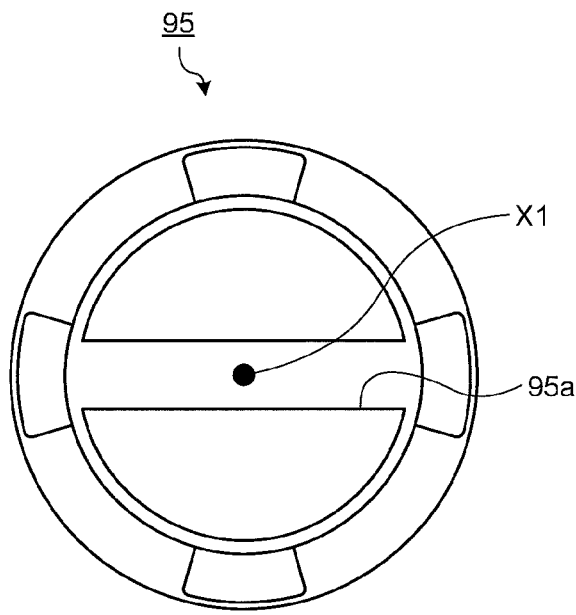
FIG. 15 is a D direction arrow view of FIG. 14.
Figure 16:
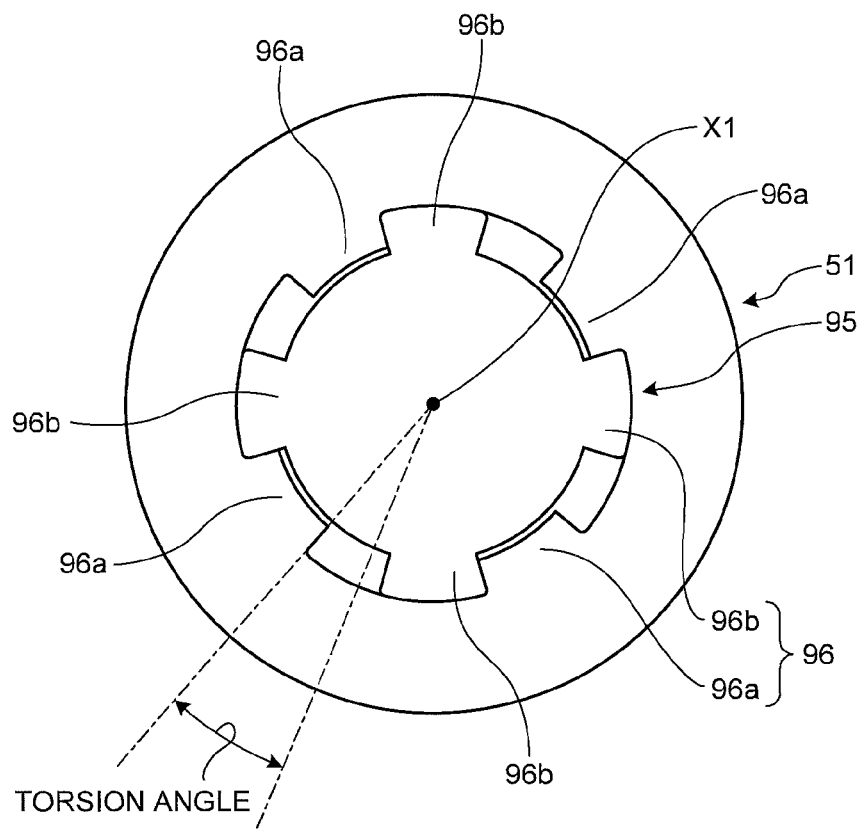
FIG. 16 is a cross-sectional view (a B-B cross-sectional view of FIG. 10) of the coupling shaft of the vehicle drive apparatus according to the first embodiment.
Figure 17:
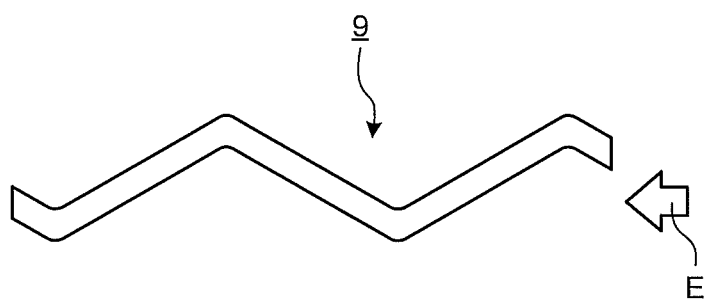
FIG. 17 is a side view of an elastic member of the vehicle drive apparatus according to the first embodiment.
Figure 18:
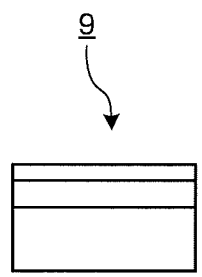
FIG. 18 is an E direction arrow view of FIG. 17.
Figure 19:
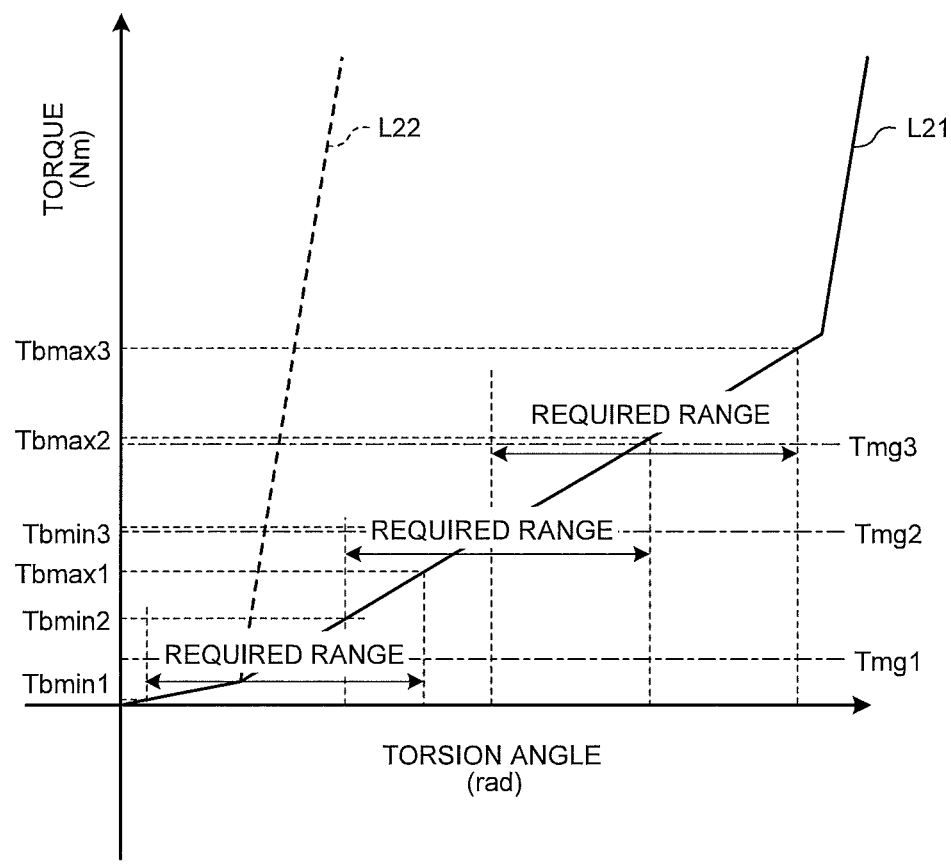
FIG. 19 is a graph representing one example of a torsional property in the vehicle drive apparatus according to the first embodiment.

FIG. 1 is a schematic configuration diagram of a vehicle equipped with a vehicle drive apparatus according to a first embodiment. FIGS. 2, 3, 4, and 5 are schematic diagrams illustrating the rotational elements between an engine and a rotary machine as a linear model. FIG. 6 is a schematic diagram describing estimation of rattling-noise occurrence positions. FIG. 7 is a schematic diagram illustrating the rotational elements between the engine and a second rotary machine in the vehicle drive apparatus according to the embodiment as a linear model. FIG. 8 is a graph describing one example of the operation of the vehicle drive apparatus according to the first embodiment. FIG. 9 is a timing chart chronologically illustrating the transition of the sum of an engine torque and a pressing-torque effective value in the vehicle drive apparatus according to the first embodiment. FIG. 10 is a partial cross-sectional view, including a holding mechanism, of the vehicle drive apparatus according to the first embodiment. FIG. 11 is a cross-sectional view (an A-A cross-sectional view of FIG. 10) of the holding mechanism of the vehicle drive apparatus according to the first embodiment. FIG. 12 is a cross-sectional view (a cross-sectional view along a rotation axis line X1) of a sleeve of the vehicle drive apparatus according to the first embodiment. FIG. 13 is a C direction arrow view of FIG. 12. FIG. 14 is a partial side view of a coupling shaft of the vehicle drive apparatus according to the first embodiment. FIG. 15 is a D direction arrow view of FIG. 14. FIG. 16 is a cross-sectional view (a B-B cross-sectional view of FIG. 10) of the coupling shaft of the vehicle drive apparatus according to the first embodiment. FIG. 17 is a side view of an elastic member of the vehicle drive apparatus according to the first embodiment. FIG. 18 is an E direction arrow view of FIG. 17. FIG. 19 is a graph representing one example of a torsional property in the vehicle drive apparatus according to the first embodiment.

A vehicle drive apparatus 1 according to this embodiment illustrated in FIG. 1 is mounted on a vehicle 2. The vehicle drive apparatus 1 is a hybrid drive system in a hybrid type that is equipped with: an engine 3; and a first rotary machine 4 and a second rotary machine 5 as rotary machines, as power sources (power engines) for running to rotatably drive a drive wheel 50 of the vehicle 2 so as to drive forward. That is, the vehicle 2 is what is called a hybrid vehicle, and is a vehicle that includes the first rotary machine 4 and the second rotary machine 5 as the power sources in addition to the engine 3. While the vehicle 2 operates the engine 3 in an efficient state as much as possible, the vehicle 2 causes the first rotary machine 4 and the second rotary machine 5 to: compensate excess and shortage of the driving force and the engine braking force; and further regenerate energy during deceleration. Accordingly, the vehicle 2 is a vehicle configured to reduce the exhaust gas from the engine 3 and simultaneously improve the fuel efficiency.

Specifically, the vehicle drive apparatus 1 includes the engine (ENG) 3, the first rotary machine 4, the second rotary machine 5, a power transmission device 6 combined with the engine 3, and an ECU 7 as a control device, so as to constitute the power train of the vehicle 2.

The engine 3 generates rotating power for causing the vehicle 2 to run. The engine 3 is a heat engine, which burns fuel in a combustion chamber to transform the energy of the fuel into mechanical work and output the mechanical work. The engine 3 allows generating mechanical power (engine torque) in an engine output shaft (crankshaft) 31 in association with the fuel burning to output this mechanical power from the engine output shaft 31 to the drive wheel 50.

The first rotary machine 4 and the second rotary machine 5 are what is called motor-generators. The motor-generator is an electric rotating machine having a combination of: a function as an electric motor (motor) that transforms a supplied electric power into a mechanical power; and a function as an electric generator (generator) that transforms an input mechanical power into an electric power. That is, the first rotary machine 4 and the second rotary machine 5 each have a combination of: a power running function that transforms the electric power supplied from an electric storage device such as a battery via an inverter or the like into a mechanical power; and a regeneration function that transforms an input mechanical power into an electric power to charge the electric storage device via the inverter or the like. The first rotary machine 4 is mainly used as an electric generator that receives the output of the engine 3 and generates electricity, but also functions as an electric motor. The second rotary machine 5 is mainly used as an electric motor that outputs power for running, but also functions as an electric generator. The second rotary machine 5, which is constituted by an AC synchronous motor and the like, can drive in response to the supply of AC power from the inverter, generate a mechanical power (motor torque) in a rotor, and output this mechanical power from the rotor to the drive wheel 50. The first rotary machine 4 also has the configuration of the AC synchronous motor similarly to the second rotary machine 5. The rotor of the first rotary machine 4 is combined with an integrally rotatable rotor shaft 41 as a rotation shaft rotatable around the rotation axis line X1. The rotor of the second rotary machine 5 is combined with a rotor shaft 51 as a rotation shaft rotatable around the rotation axis line X1. The rotor shaft 41, the rotor shaft 51, and the above-described engine output shaft 31 are coaxially arranged having the common rotation axis line X1 as the rotational center. During power running, the first rotary machine 4 and the second rotary machine 5 can consume electric power to output torque and use the output torque to rotatably drive the rotor shaft 41 and the rotor shaft 51. During regeneration, the first rotary machine 4 and the second rotary machine 5 can be rotatably driven by the torques transmitted to the rotor shaft 41 and the rotor shaft 51 to generate electricity, so as to cause the load torques (reaction force torques) corresponding to the electricity generation loads to act on the rotor shaft 41 and the rotor shaft 51.

The power transmission device 6 transmits the power generated by a running power source such as the engine 3 to the drive wheel 50. The drive wheel 50 is rotatably driven by the power transmitted via the power transmission device 6. The power transmission device 6 includes an output member 61, a differential mechanism 62, and the like. The power transmission device 6 transmits the rotating power generated by the running power source such as the engine 3 to the drive wheel 50 sequentially via the differential mechanism 62, the output member 61, and the like.

The output member 61 typically outputs the rotating power transmitted from the differential mechanism 62 to the drive wheel 50. The output member 61, which is a rotation shaft rotatable around a rotation axis line X2 parallel to the rotation axis line X1, couples to the drive wheel 50 of the vehicle 2. The output member 61 is integrally rotatably combined with a driven gear 63.

The differential mechanism 62 includes a plurality of differentially rotatable rotational elements. The differential mechanism 62 couples the engine 3, the first rotary machine 4, the second rotary machine 5, and the output member 61 together to be differentially rotatable via the plurality of rotational elements. The differential mechanism 62 includes, as the plurality of rotational elements, at least an engine rotational element, a first-rotary-machine rotational element, a second-rotary-machine rotational element, and an output rotational element. The engine rotational element couples to the engine 3 and receives the power from the engine 3. The first-rotary-machine rotational element couples to the first rotary machine 4 and receives the power from the first rotary machine 4. The second-rotary-machine rotational element couples to the second rotary machine 5 and receives the power from the second rotary machine 5. The output rotational element couples to the output member 61 and outputs the rotating power to the drive wheel 50.

The differential mechanism 62 of this embodiment includes a first planetary gear mechanism 64 and a second planetary gear mechanism 65. While in the description the first planetary gear mechanism 64 and the second planetary gear mechanism 65 of this embodiment are each constituted by what is called a single-pinion type planetary gear mechanism, these planetary gear mechanisms are not limited to this. For example, the configuration may employ a double-pinion type planetary gear mechanism. The first planetary gear mechanism 64 and the second planetary gear mechanism 65 have the respective rotational elements, which are mutually differentially rotatable, arranged having the rotational centers coaxially with the rotation axis line X1. The respective rotational elements are rotatable around the rotation axis line X1 as the rotational center by transmissions of power.

Here, the first planetary gear mechanism 64 includes, as the plurality of mutually differentially rotatable rotational elements, a first sun gear S1, a first ring gear R1, and a first carrier C1. The first sun gear S1 is an external gear. The first ring gear R1 is an internal gear arranged coaxially with the first sun gear S1. The first carrier C1 rotatably and revolvably holds the first sun gear S1 or the first ring gear R1, here, a plurality of pinion gears P1, which engages with both the gears.

The second planetary gear mechanism 65 includes, as the plurality of mutually differentially rotatable rotational elements, a second sun gear S2, a second ring gear R2, and a second carrier C2. The second sun gear S2 is an external gear. The second ring gear R2 is an internal gear arranged coaxially with the second sun gear S2. The second carrier C2 rotatably and revolvably holds the second sun gear S2 or the second ring gear R2, here, a plurality of pinion gears P2, which engages both the gears.

In the differential mechanism 62 of this embodiment, the first carrier C1 of the first planetary gear mechanism 64 is the engine rotational element coupled to the engine output shaft 31 of the engine 3, the first sun gear S1 of the first planetary gear mechanism 64 is the first-rotary-machine rotational element coupled to the rotor shaft 41 of the first rotary machine 4, and the first ring gear R1 of the first planetary gear mechanism 64 is the output rotational element coupled to the output member 61. Furthermore, in the differential mechanism 62, the second sun gear S2 of the second planetary gear mechanism 65 is the second-rotary-machine rotational element coupled to the rotor shaft 51 of the second rotary machine 5, and the second ring gear R2 of the second planetary gear mechanism 65 is the output rotational element coupled to the output member 61. In this differential mechanism 62, the second carrier C2 of the second planetary gear mechanism 65 is a fixed rotational element coupled to a fixed portion such as a casing 8. Here, the casing 8 houses the respective portions of the power transmission device 6. The first ring gear R1 and the second ring gear R2 are integrally rotatably combined together and are combined integrally rotatably with a drive gear 66. The drive gear 66 power-transmittably engages with the above-described driven gear 63.

That is, the first rotary machine 4 couples to the engine 3 via the first planetary gear mechanism 64, and is disposed parallel to the power transmission path from this engine 3 to the drive wheel 50 in the power transmission device 6. The second rotary machine 5 couples to the engine 3 via the first planetary gear mechanism 64 and the second planetary gear mechanism 65, and is disposed parallel to the power transmission path from this engine 3 to the drive wheel 50 in the power transmission device 6. The first rotary machine 4 and the second rotary machine 5 both function as devices that receive the reactive force of the rotating power of the engine 3 when the rotating power generated by the engine 3 transmits to the drive wheel 50 (that is, during engine running of the vehicle 2).

The ECU 7, which controls the driving of the respective portions of the vehicle 2, includes an electronic circuit mainly constituted of a well-known microcomputer including a CPU, a ROM, a RAM, and an interface. The ECU 7 electrically couples to, for example, various sensors and detectors and receives electrical signals corresponding to the detection results. The ECU 7 electrically couples to the respective portions of the vehicle 2, for example, the engine 3, the first rotary machine 4, and the second rotary machine 5. The ECU 7 executes a stored control program based on various input signals input from the various sensors and the detectors or various maps, so as to output drive signals to the respective portions of the vehicle 2 and control the driving of these portions.

The vehicle drive apparatus 1 constituted as described above causes rotatably driving of the engine 3, the first rotary machine 4, or the second rotary machine 5 so as to transmit its power to the respective drive wheels 50 via the differential mechanism 62, the drive gear 66, the driven gear 63, the output member 61, and the like in the power transmission device 6. This allows the vehicle 2 to run by rotation of the respective drive wheels 50. At this time, the ECU 7 cooperatively controls the engine 3, the first rotary machine 4, and the second rotary machine 5 to concurrently use or selectively use the engine 3, the first rotary machine 4, and the second rotary machine 5 as the power engine. Accordingly, the vehicle drive apparatus 1 allows the vehicle 2 to run in various running modes such as an engine running mode, an HV running mode, an EV running mode, a regenerative running mode. Here, for example, the engine running mode is a running mode that causes the vehicle 2 to run using the power of the engine 3 without using the power of the first rotary machine 4 or the second rotary machine 5. The HV running mode is a running mode that causes the vehicle 2 to run using the power of the engine 3 and the power of the second rotary machine 5 (or the first rotary machine 4). The EV running mode is a running mode that causes the vehicle 2 to run using the power of the second rotary machine 5 (or the first rotary machine 4) without using the power of the engine 3. The regenerative running mode is a running mode that performs regenerative braking using the second rotary machine 5 (or the first rotary machine 4) during deceleration of the vehicle 2.

Incidentally, in this vehicle drive apparatus 1, the engine 3 tends to have a relatively larger explosion primary output variation than, for example, the output variation in power of the second rotary machine 5 or the like. Accordingly, for example, in the case where a gap (hereinafter sometimes referred to as "backlash") has occurred in the engaging portions (power transmitting portions) between the respective elements (gear elements) in the driving system such as the power transmission device 6 due to the output variation in this engine 3, the vehicle drive apparatus 1 might have a collision between the tooth surfaces in these engaging portions. In the vehicle drive apparatus 1, the occurrence of the above-described tooth hitting (rattling) in the engaging portions between the respective elements in the power transmission device 6 or the like in association with the output variation in the engine 3 might cause rattling sound such as what is called tooth hitting noise (hitting sound). This might cause a louder sound noise so as to provide uncomfortable feeling to the occupant in the vehicle 2.

In response, the ECU 7 sometimes executes, for example, a pre-torque control that controls the first rotary machine 4 and the second rotary machine 5 to output a pressing torque using these first rotary machine 4 and second rotary machine 5. This suppresses the gap in the engaging portions between the respective elements to suppress the above-described tooth hitting noise so as to suppress the sound noise and the vibration. Here, the pressing torque is a torque given by the first rotary machine 4, the second rotary machine 5, and the like in the pre-torque control. More specifically, the pressing torque is a backlash reducing torque for reducing the gaps (backlashes) in the engaging portions between the plurality of rotational elements in the power transmission device 6 including the differential mechanism 62, and is a torque for pressing the respective tooth surfaces in the engaging portions against one another.

However, in the vehicle drive apparatus 1, also in the case where the pre-torque control is executed as described above, tooth hitting might occur in the engaging portions between the respective elements of the power transmission device 6 so as to cause sound noise depending on circumstances.

Therefore, the vehicle drive apparatus 1 of this embodiment includes, for example, an elastic member 9, which couples the rotor shaft 51 of the second rotary machine 5 to the rotational element of the differential mechanism 62 to be relatively rotatable, to appropriately suppress the above-described tooth hitting so as to suppress the occurrence of sound noise. Here, the elastic member 9 couples the second sun gear S2 of the second planetary gear mechanism 65 as the rotational element of the differential mechanism 62 to the rotor shaft 51 of the second rotary machine 5 to be relatively rotatable.

The vehicle drive apparatus 1 may include, in addition to the elastic member 9, another elastic member that couples the rotor shaft 41 of the first rotary machine 4 to the rotational element (here, the first sun gear S1) of the differential mechanism 62 to be relatively rotatable. The vehicle drive apparatus 1 may include, instead of the elastic member 9, an elastic member that couples the rotor shaft 41 of the first rotary machine 4 to the rotational element of the differential mechanism 62 to be relatively rotatable. Here, the following describes the configuration where the vehicle drive apparatus 1 includes the elastic member 9, and the other configurations are omitted as much as possible.

Here, in the vehicle drive apparatus 1, the second rotary machine 5 has a relatively large count of the engaging portions of the rotational elements intervening up to the engine 3, thus having a relatively large accumulated backlash. Accordingly, this second rotary machine 5 tends to be likely to have more occurrences of tooth hitting, sound noise, and the like than the first rotary machine 4. Accordingly, disposing the elastic member 9 to couple the rotor shaft 51 of the second rotary machine 5 to the rotational element of the differential mechanism 62 allows the vehicle drive apparatus 1 of this embodiment to more preferably suppress the occurrence of sound noise.

Here, firstly, the mechanism for generating rattling sound such as the above-described tooth hitting noise will be described in more detail with reference to FIGS. 2, 3, 4, and 5. FIGS. 2, 3, 4, and 5 illustrate, for ease of explanation, motion models expressed by transforming a rotational motion in the rotational elements between the engine 3 and the second rotary machine 5 into a linear motion. Here, a vehicle drive apparatus without the elastic member 9 according to a comparative example will be described as an example. The vehicle drive apparatus according to the comparative example does not include the elastic member 9, but is otherwise similar to the vehicle drive apparatus 1 of this embodiment, and performs control similar to that of this vehicle drive apparatus 1. Here, while the second rotary machine 5 will be described as an example, rattling sound such as tooth hitting noise occurs also in the first rotary machine 4 by an approximately similar mechanism.

Figure 2:
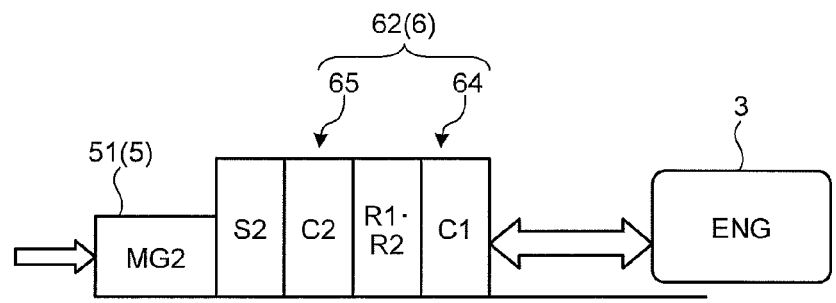
FIG. 2 is a schematic diagram illustrating the rotational elements between an engine and a rotary machine as a linear model.

In the second rotary machine 5, as illustrated in FIG. 2, at least the first carrier C1 and the first ring gear R1 in the first planetary gear mechanism 64 and the second ring gear R2, the second carrier C2, and the second sun gear S2 in the second planetary gear mechanism 65 intervene between the engine 3 and the rotor shaft 51 in this order from the engine 3 side. That is, when the rotating power generated by the engine 3 transmits to the drive wheel 50, the second rotary machine 5 receives the reactive force of the rotating power of this engine 3 via the first carrier C1, the first ring gear R1, the second ring gear R2, the second carrier C2, and the second sun gear S2 in the plurality of rotational elements constituting the differential mechanism 62. Note that the first ring gear R1 and the second ring gear R2 are integrally formed, and are thus illustrated as an integrated member here.

The ECU 7 controls the second rotary machine 5 such that this second rotary machine 5 outputs and holds a pressing torque (backlash reducing torque), so as to execute the pre-torque control, which reduces the above-described gaps (backlashes) in the engaging portions between the respective rotational elements. Here, the engaging portions between the respective rotational elements correspond to: the engaging portion between the first carrier C1 (for more detail, the pinion gear P1 held by this first carrier C1) and the first ring gear R1; the engaging portion between the second ring gear R2 and the second carrier C2 (for more detail, the pinion gear P2 held by this second carrier C2); and the engaging portion between the second carrier C2 and the second sun gear S2. This allows the second rotary machine 5 to press mutually the tooth surfaces in the above-described engaging portions between the respective rotational elements using the above-described pressing torque. That is, as illustrated in FIG. 3, on this model, the second rotary machine 5 allows the rotor shaft 51 to cause strokes of the second sun gear S2, the second carrier C2, the second ring gear R2, the first ring gear R1, and the first carrier C1 up to a predetermined stroke limit (pressing limit) on the engine 3 side, so as to press them against the engine 3 side.

Figure 3:
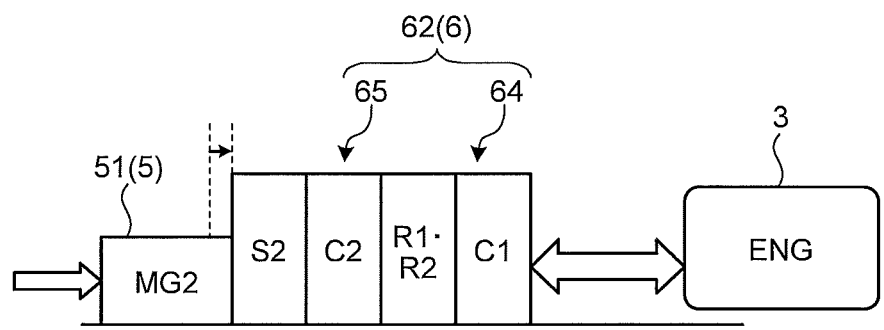
FIG. 3 is a schematic diagram illustrating the rotational elements between the engine and the rotary machine as a linear model.

In the vehicle drive apparatus according to the comparative example, in the region where the rotational fluctuation amount (engine-rotation-speed range) corresponding to the output variation in the engine 3 is relatively small, as illustrated in FIG. 3, the pressing torque output from the second rotary machine 5 effectively acts to maintain a satisfactory state without any gap in the engaging portions between the respective elements, so as to suppress the sound noise and the vibration.

Figure 4:
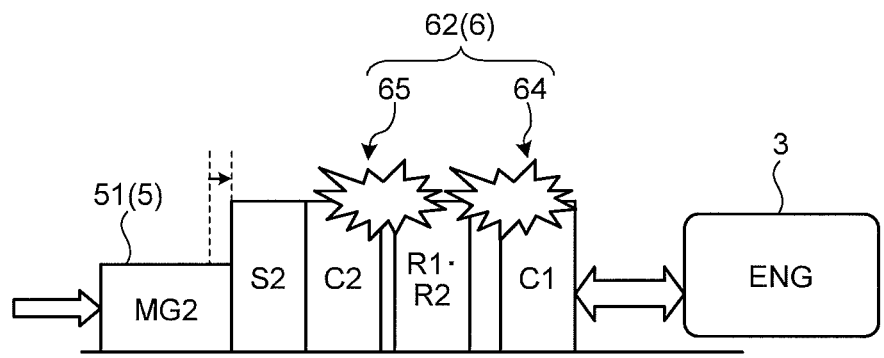
FIG. 4 is a schematic diagram illustrating the rotational elements between the engine and the rotary machine as a linear model.
Figure 5:
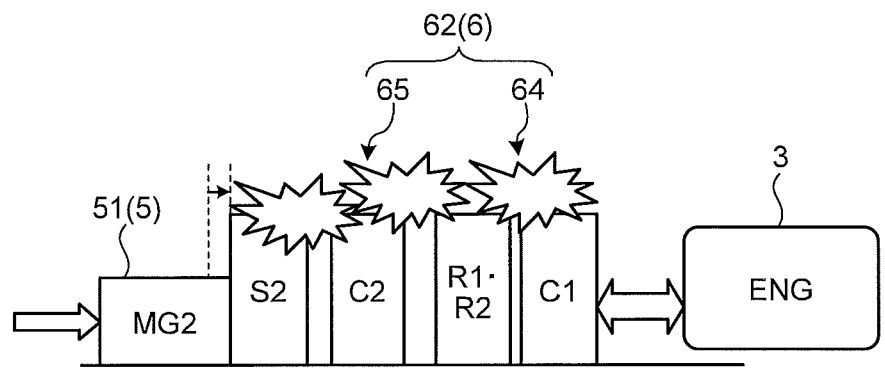
FIG. 5 is a schematic diagram illustrating the rotational elements between the engine and the rotary machine as a linear model.

In the vehicle drive apparatus according to the comparative example, the rotational fluctuation amount corresponding to the output variation in the engine 3 gradually increases. As illustrated in FIG. 4, when the pullback speed of the first carrier C1 by the engine 3 exceeds a backlash reducing speed (stroke speed) by the pressing torque of the second rotary machine 5, a gap (backlash) occurs in the engaging portion between the rotational elements on the engine 3 side. Here, the vehicle drive apparatus according to the comparative example causes gaps in: the engaging portion between the first carrier C1 and the first ring gear R1; and the engaging portion between the second ring gear R2 and the second carrier C2. This causes tooth hitting in these engaging portions, thus causing sound noise and vibration.

In the vehicle drive apparatus according to the comparative example, shifting to a region where this rotational fluctuation amount is relatively large due to a further increase in rotational fluctuation amount corresponding to the output variation in the engine 3 further increases the pullback speed of the first carrier C1 by the engine 3. On the other hand, in the vehicle drive apparatus according to the comparative example, the second rotary machine 5 typically cannot output the torque following the displacement due to the torque change caused by the engine 3. This causes the gaps in the engaging portions between all the rotational elements intervening between the engine 3 and the second rotary machine 5, thus causing relatively large sound noise and vibration.

As described above, in the vehicle drive apparatus according to the comparative example, a larger separating force corresponding to the output variation in the engine 3 than the pressing force by the second rotary machine 5 in any of the engaging portions between the respective rotational elements causes a gap in this engaging portion so as to cause tooth hitting noise. Here, the separating force corresponds to the force when the engine 3 pulls back the first carrier C1 corresponding to the output variation in this engine 3, in other words, a force that separates (the force that moves) the tooth surfaces in the engaging portions between the respective rotational elements from (away from) one another. The pressing force corresponds to a force that presses the tooth surfaces in the engaging portions between the respective rotational elements against one another by the pressing torque from the second rotary machine 5. The separating force and the pressing force in the respective engaging portions are each amplified or attenuated corresponding to the gear ratios of the first planetary gear mechanism 64 and the second planetary gear mechanism 65 or the like with reference to the whirling torque of the engine 3 and the pressing torque generated by the second rotary machine 5.

Here, for example, the ECU 7 and the like in this embodiment compares the magnitude relationship between the separating force and the pressing force in the respective engaging portions taking into consideration the mechanism of generation of the above-described rattling sound such as tooth hitting noise, so as to allow estimating the occurrence position of the tooth hitting noise. For example, the ECU 7 estimates the pressing force in the engaging portion to be the occurrence-determination target for the tooth hitting noise based on various parameters representing the output of the second rotary machine 5, the gear ratios of the first planetary gear mechanism 64 and the second planetary gear mechanism 65, and the like. The ECU 7 estimates the separating force in the engaging portion as the occurrence-determination target for the tooth hitting noise based on various parameters representing the output of the engine 3, the gear ratios of the first planetary gear mechanism 64 and the second planetary gear mechanism 65, and the like. In the case where the ECU 7 determines that the pressing force is equal to or more than the separating force, the ECU 7 allows estimating that no gap occurs and thus no tooth hitting noise occurs at least in the engaging portions (including the engaging portion as the determination target) on the second rotary machine 5 side with respect to the engaging portion as the occurrence-determination target. On the other hand, in the case where the ECU 7 determines that the pressing force is smaller than the separating force, the ECU 7 allows estimating that the gap might occur so as to cause tooth hitting noise in the engaging portion (including the engaging portion as the determination target) on the engine 3 side with respect to the engaging portion as the occurrence-determination target.

For example, with reference to FIG. 6, a description will be given of the case where a gap occurs so as to cause tooth hitting noise in the engaging portion (the engaging portion between the second carrier C2 and the second ring gear R2) on the engine 3 side with respect to the engaging portion between the second carrier C2 and the second ring gear R2. In FIG. 6, "Mg" denotes the mass of the second rotary machine 5, "Ms" denotes the mass of the second sun gear S2, "Mc" denotes the mass of the second carrier C2, "Mr" denotes the mass of the first ring gear R1 and the second ring gear R2, and "Me" denotes the mass of the engine 3 and the first carrier C1. In FIG. 6, "Fm" denotes the force (the pressing force) generated by the second rotary machine 5 corresponding to the pressing torque, "Fe" denotes the force (the separating force) generated corresponding to the output variation in the engine 3, "Ls" denotes the resisting force of the second sun gear S2, "Lc" denotes the resisting force of the second carrier C2, "Lr" denotes the resisting force of the first ring gear R1 and the second ring gear R2. Assume that Ae=Fe/Me, Mp3=Mg+Ms, Fp3=Fm−Ls, Ap3=Fp3/Mp3, Mp2=Mg+Ms+Mc, Fp2=Fm−Ls−Lc, Ap2=Fp2/Mp2, Mp1=Mg+Ms+Mc+Mr, Fp2=Fm−Ls−Lc−Lr, and Ap1=Fp1/Mp1. In this case, the condition where Ap1<Ae, Ap2<Ae, and Ap3>Ae satisfies the condition that causes gaps from the engaging portion between the second carrier C2 and the second ring gear R2 to the engaging portion on the engine 3 side so as to cause tooth hitting noise.

In the case where the rotational fluctuation amount corresponding to the output variation in the engine 3 becomes relatively large as described above, the vehicle drive apparatus 1 according to this embodiment also allows relatively increasing the pressing torque output from the second rotary machine 5 so as to suppress the tooth hitting noise. However, in this case, the second rotary machine 5 might increase in size to ensure a predetermined output performance of this second rotary machine 5. When the pressing torque output from the second rotary machine 5 relatively increases in the pre-torque control, the vehicle drive apparatus 1 might need to, for example, activate the braking device of the vehicle 2 to brake the vehicle 2 so as to prevent the vehicle 2 from starting to move. This might correspondingly increase the loss so as to deteriorate the fuel efficiency performance.

Therefore, as described above, the vehicle drive apparatus 1 of this embodiment has, as illustrated in FIGS. 1 and 7, the configuration that includes the elastic member 9 and where the rotor shaft 51 of the second rotary machine 5 couples to the rotational element of the differential mechanism 62 via this elastic member 9. Accordingly, the vehicle drive apparatus 1 has the configuration where the inertial masses of the respective rotational elements (the gear train in the power transmission device 6) intervening between the second rotary machine 5 and the engine 3 are separated from the inertial mass of the second rotary machine 5 itself by the elastic member 9. As a result, the vehicle drive apparatus 1 allows avoiding the situation where the inertial mass of the second rotary machine 5 acts as a rigid body on the respective rotational elements transmitting the power in the differential mechanism 62 of the power transmission device 6. Accordingly, the vehicle drive apparatus 1 allows improving the responsivity of the pressing force actually acting on the respective engaging portions in response to the output of the pressing torque from the second rotary machine 5 in the pre-torque control. This allows improving the follow-up responsivity of the pressing force actually acting on the respective engaging portions in the pre-torque control in response to the output variation in the engine 3. Accordingly, the vehicle drive apparatus 1 allows, for example, properly suppressing the occurrence of sound noise in addition to the suppression of the increase in device size and the deterioration in fuel efficiency performance.

For example, as illustrated in FIG. 7, a description will be given of the case where the inertial mass of the second rotary machine 5 is denoted as "Img," the inertial mass of the second sun gear S2 is denoted as "Is," the inertial mass of the second carrier C2 is denoted as "Ic," the inertial mass of the first ring gear R1 and the second ring gear R2 is denoted as "Ir," and the MG control torque (the control command value of the pressing torque) as a controlled variable of the second rotary machine 5 in the pre-torque control is denoted as "Tmg."

In this case, an angler acceleration (dωy/dt)' in the vehicle drive apparatus without the elastic member 9 according to the comparative example can be expressed by the following formula (1). Here, the angler acceleration (dωy/dt)' is the angler acceleration of the second sun gear S2, the second carrier C2, the first ring gear R1, and the second ring gear R2 by the second rotary machine 5.

$$(d\omega y/dt)'=Tmg/(Img+Is+Ic+Ir) \qquad (1)$$

On the other hand, an angler acceleration (dωy/dt) in the vehicle drive apparatus 1 according to this embodiment can be expressed by the following formula (2). Here, the angler acceleration (dωy/dt) is the angler acceleration of the second sun gear S2, the second carrier C2, the first ring gear R1, and the second ring gear R2 by the second rotary machine 5.

$$(d\omega y/dt)=Tmg/(Is+Ic+Ir) \qquad (2)$$

The comparison between the angler acceleration (dωy/dt) of this embodiment and the angler acceleration (dωy/dt)' of the comparative example shows [Img>>Is+Ic+Ir], and thus shows [(dωy/dt)>>(dωy/dt)']. This helps to understand that the vehicle drive apparatus 1 according to this embodiment improves the follow-up responsivity of the pressing force in the pre-torque control in response to the output variation in the engine 3 relative to the vehicle drive apparatus of the comparative example.

In the case where the following formula (3) is satisfied, the vehicle drive apparatus 1 allows appropriately suppressing the occurrence of the gaps (backlashes) in the engaging portions between the rotational elements so as to suppress the sound noise such as tooth hitting noise and the vibration. In the formula (3), "Tb" denotes the pressing-torque effective value when the second rotary machine 5 presses the respective rotational elements in the power transmission system against one another during the control on the second rotary machine 5 using the MG control torque Tmg corresponding to a predetermined pressing torque. "Ib" denotes the inertial mass of the member coupled to the engine 3 side via a tooth surface in the respective rotational elements. "Te" denotes the engine torque output from the engine 3, "Ie" denotes the inertial mass of the member (including the engine output shaft 31, the first carrier C1, and the like) whirling integrally with the engine 3, and "dωe/dt" denotes the angler acceleration.

$$Tb/Ib > d\omega e/dt = Te/Ie \qquad (3)$$

The ECU 7 in the pre-torque control controls the MG control torque Tmg for the second rotary machine 5 to adjust the pressing torque output from this second rotary machine 5 and thus adjust the pressing-torque effective value Tb, so as to satisfy the above-described formula (3). Accordingly, the second rotary machine 5 allows the pressing force generated by the second rotary machine 5 to act on the engaging portions between the respective rotational elements via the elastic member 9.

As understood from the above-described formula (3), the vehicle drive apparatus 1 in this pre-torque control allows increasing the MG control torque Tmg to increase the pressing-torque effective value Tb or decreasing the inertial mass Ib so as to improve the follow-up responsivity of the pressing force of the second rotary machine 5 in response to the output variation in the engine 3. In the vehicle drive apparatus 1 of this embodiment, coupling between the rotor shaft 51 of the second rotary machine 5 and the rotational element of the differential mechanism 62 via this elastic member 9 as described above relatively decreases the inertial mass Ib so as to improve the follow-up responsivity of the pressing force in addition to the suppression of the increase in device size and the deterioration in fuel efficiency performance.

For example, the inertial mass Ib of the vehicle drive apparatus according to the comparative example corresponds to the sum (Ib=Img+Is, Ic, and Ir) of the inertial mass Img of the second rotary machine 5 and the inertial masses Is, Ic, and Ir of the rotational elements (the second sun gear S2, the second carrier C2, the first ring gear R1, and the second ring gear R2) intervening between: the member whirling integrally with the engine 3; and the second rotary machine 5.

In contrast, in the vehicle drive apparatus 1, the elastic member 9 separates the inertial mass of the second rotary machine 5 from the inertial masses of the respective rotational elements (the gear train in the power transmission device 6) intervening between the second rotary machine 5 and the engine 3. Accordingly, the inertial mass Ib of the vehicle drive apparatus 1 according to this embodiment corresponds to the inertial masses Is, Ic, and Ir (Ib=Is, Ic, and Ir) of the rotational elements (the second sun gear S2, the second carrier C2, the first ring gear R1, and the second ring gear R2) intervening between: the member whirling integrally with the engine 3; and the elastic member 9. That is, the vehicle drive apparatus 1 allows relatively decreasing the inertial mass Ib, thus consequently ensuring a satisfactory follow-up responsivity also when the pre-torque control relatively decreases the MG control torque Tmg so as to relatively decrease the pressing torque output from the second rotary machine 5.

Furthermore, when the pre-torque control is actually controlled using the MG control torque Tmg, the MG control torque Tmg can be expressed by the following formula (4).

$$Tmg = Img \cdot d\omega mg/dt + Is \cdot d\omega s/dt + Ic \cdot d\omega c/dt + Ir \cdot d\omega r/dt \qquad (4)$$

As described above, the vehicle drive apparatus according to the comparative example has the considerably larger inertial mass Img of the second rotary machine 5 than the inertial masses Is, Ic, and Ir, and thus might not obtain a sufficient angler acceleration.

In contrast, in the vehicle drive apparatus 1 of this embodiment, the elastic member 9 separates the second rotary machine 5 from the second sun gear S2. The biasing force of this elastic member 9 presses the second sun gear S2, the second carrier C2, the first ring gear R1, and the second ring gear R2 against the engine 3 side. This allows the vehicle drive apparatus 1 to drive the inertial masses Is, Ic, and Ir using the biasing force of the elastic member 9 even by the small MG control torque Tmg after the inertial mass Img of the second rotary machine 5 is separated from the inertial masses Is, Ic, and Ir, thus sufficiently increasing Is·dωs/dt, Ic·dωc/dt, and Ir·dωr/dt. As a result, the vehicle drive apparatus 1 allows the second sun gear S2, the second carrier C2, the first ring gear R1, and the second ring gear R2 to rapidly follow the motion on the engine 3 side, so as to allow the tooth surfaces in the respective engaging portions to preferably follow the output variation in the engine 3. This allows suppressing the occurrence of the gaps (backlashes) in the engaging portions between the rotational elements. For example, also when the MG control torque Tmg is zero, the vehicle drive apparatus 1 allows the second sun gear S2, the second carrier C2, the first ring gear R1, and the second ring gear R2 to follow the motion on the engine 3 side using the biasing force of the elastic member 9 for the output variation in the engine 3 up to a certain magnitude so as to suppress the occurrence of backlashes.

FIG. 8 is a graph describing the outline of the operation of the vehicle drive apparatus 1 described above. In FIG. 8, the horizontal axis denotes the swing angle (in other words, the whirling angle caused by the output variation in the engine 3) of the second sun gear S2, the second carrier C2, the first ring gear R1, and the second ring gear R2, and the vertical axis denotes the torque. The swing angle corresponds to the torsion angle of the elastic member 9. In FIG. 8, a solid line L1 denotes the torque (in other words, the pressing-torque effective value Tb) acting on the second sun gear S2 and the like via the elastic member 9 corresponding to the swing angle in the state where the second rotary machine 5 outputs a torque based on the MG control torque Tmg, and shows the property corresponding to the spring property of the elastic member 9.

In FIG. 8, a required range corresponds to the accumulated gap (backlash) in the engaging portions between the rotational elements intervening between the second rotary machine 5 and the engine 3. The accumulated gap in the engaging portions between the respective rotational elements varies within the range of this required range corresponding to the output variation in the engine 3. That is, the tooth surfaces in the engaging portions between the respective rotational elements are brought close to or separated from one another within the range of this required range. In the vehicle drive apparatus 1, in the case where the tooth surfaces in the engaging portions between the respective rotational elements are pressed against one another up to the limit swing angle in the range of the required range corresponding to the output variation in the engine 3, the pressing-torque effective value Tb becomes a maximum value Tbmax due to the torque output from the second rotary machine 5 based on the MG control torque Tmg and the biasing force of the compressed elastic member 9. In the vehicle drive apparatus 1, in the case where the tooth surfaces in the engaging portions between the respective rotational elements start to be separated from one another up to the limit swing angle in the range of the required range corresponding to the output variation in the engine 3, the pressing-torque effective value Tb becomes a minimum value Tbmin due to the torque output from the second rotary machine 5 based on the MG control torque Tmg and the biasing force of the stretched elastic member 9. That is, the maximum value Tbmax and the minimum value Tbmin of the pressing-torque effective value Tb are determined corresponding to at least the MG control torque Tmg, the spring property (equivalent to the spring constant and the gradient of the straight line L1) of the elastic member 9, and the required range. In the pre-torque control, the MG control torque Tmg and the spring property of the elastic member 9 are preliminarily set based on the real vehicle evaluation and the like such that the minimum value Tbmin of the pressing-torque effective value Tb is ensured to have a magnitude that allows appropriately pressing the tooth surfaces in the respective engaging portions against one another in response to the output variation in the engine 3 based on the required range and the like and such that the maximum value Tbmax of the pressing-torque effective value Tb does not unnecessarily increase.

As a result, the vehicle drive apparatus 1 allows suppressing the situation where, as illustrated in FIG. 9, the sum of the engine torque Te and the pressing-torque effective value Tb becomes a negative value, that is, allows the tooth surfaces in the respective engaging portions to preferably follow the output variation in the engine 3 as described above. Accordingly, the vehicle drive apparatus 1 allows suppressing the occurrence of the gaps (backlashes) in the engaging portions between the rotational elements, thus suppressing the rattling sound such as tooth hitting noise so as to suppress the sound noise and the vibration. Furthermore, in the vehicle drive apparatus 1, for example, even when the second rotary machine 5 maintains the initial pressing force and this second rotary machine 5 does not move, the action of the elastic member 9 allows suppressing the occurrence of the gap in the engaging portions between the rotational elements so as to suppress the rattling sound such as tooth hitting noise.

The following describes one example of the installation example of the elastic member 9 with reference to FIGS. 10 to 18.

The vehicle drive apparatus 1 of this embodiment includes the elastic member 9 within the rotor shaft 51 of the second rotary machine 5 as illustrated in FIGS. 10 and 11 and the like. This vehicle drive apparatus 1 includes a holding mechanism 91 for holding the elastic member 9.

Here, the configuration of the second rotary machine 5 will be described in more detail. As illustrated in FIG. 10, the second rotary machine 5 includes a stator 5S as a stator and a rotor 5R as a rotor. The stator 5S is secured to the casing 8 and the like. The rotor 5R is arranged radially inward of the stator 5S and combined integrally rotatably with the rotor shaft 51. The rotor shaft 51 is formed in a cylindrical shape whose outer peripheral surface is combined with the rotor 5R. The rotor shaft 51 has both ends rotatably supported by the casing 8 and the like via bearings B1 and B2 and the like. The rotor shaft 51 is arranged having the central axis line coaxially with this rotation axis line X1, and is supported rotatably around the rotation axis line X1.

As illustrated in FIGS. 10 and 11, the holding mechanism 91 is arranged on the inner peripheral surface side of the rotor shaft 51 and holds the elastic member 9 within this rotor shaft 51. The holding mechanism 91 of this embodiment has a sleeve 92 as a rotation-shaft-side rotating member and a holding member 93 as a rotational-element-side rotating member. The sleeve 92 is disposed within the rotor shaft 51 and rotates integrally with this rotor shaft 51. The holding member 93 is disposed within the rotor shaft 51 and rotates integrally with the rotational element of the differential mechanism 62, here, the second sun gear S2 (see FIG. 1). The holding mechanism 91 holds the elastic member 9 between the sleeve 92 and the holding member 93. In the holding mechanism 91, the sleeve 92 and the holding member 93 are relatively rotatable in the circumferential direction within the range of the torsion angle that allows the required range corresponding to the output variation in the engine 3. In other words, the holding mechanism 91 holds the elastic member 9 between the sleeve 92 and the holding member 93 such that the follow-up range (the allowable torsion angle) of the elastic member 9 becomes larger than the above-described required range. This allows the holding mechanism 91 to hold the elastic member 9 such that this elastic member 9 can properly expand and contract between the sleeve 92 and the holding member 93 corresponding to the output variation in the engine 3. Here, the holding mechanism 91 further includes a key member 94, a coupling shaft 95, and the like.

Specifically, the sleeve 92 is formed in a cylindrical shape as illustrated in FIGS. 10, 11, 12, and 13. The sleeve 92 has one end portion having an outer peripheral surface where a key-member fitting groove 92a is formed. The sleeve 92 has, on its inner peripheral surface side, a hollow portion that functions as a housing space portion 92b, which houses the elastic member 9 and the holding member 93. The housing space portion 92b is formed such that an opening 92d on the other end portion side is larger than an opening 92c on the one end portion side where the key-member fitting groove 92a is formed. The sleeve 92 has, on its inner peripheral surface, bulge portions 92e formed projecting to the housing space portion 92b side. The bulge portions 92e are disposed in pairs to extend along the axial direction of the central axis line (equivalent to the rotation axis line X1 in the installation position) and to be in approximately symmetrical positions with respect to this central axis line. The sleeve 92 is arranged on the inner peripheral surface side of the rotor shaft 51 such that the opening 92d on the other end portion side of the housing space portion 92b is positioned on the second sun gear S2 (see FIG. 1 and the like) side. The sleeve 92 is arranged on the inner peripheral surface side of the rotor shaft 51 in the positional relationship where a key-member fitting groove 51a formed on the inner peripheral surface of the rotor shaft 51 radially faces the above-described key-member fitting groove 92a. The sleeve 92 is secured to the rotor shaft 51 by inserting and fitting the key member 94 to the key-member fitting groove 51a and the key-member fitting groove 92a. Accordingly, the sleeve 92 is assembled to be rotatable integrally with the rotor shaft 51 around the rotation axis line X1.

As illustrated in FIGS. 10 and 11, the holding member 93 is formed in a plate shape and is inserted into the sleeve 92. The holding member 93 includes respective projecting portions 93a formed projecting from both surfaces of the plate shape. The projecting portions 93a are disposed in pairs to extend along the axial direction of the rotation axis line X1 in the installation position and to be in approximately symmetrical positions with respect to this rotation axis line X1. The holding member 93 is inserted into the housing space portion 92b of the sleeve 92 from the end portion on the opening 92d side of this sleeve 92, so as to be housed. In the state where the holding member 93 is housed within the housing space portion 92b, the end portion on the opening 92d side couples to the coupling shaft 95.

As illustrated in FIGS. 10, 14, 15, and 16, the coupling shaft 95 is formed in a columnar shape and has one end integrally rotatably coupled to the second sun gear S2 (see FIG. 1). As illustrated in FIGS. 10 and 16, the coupling shaft 95 is assembled relatively rotatably to the rotor shaft 51 up to a predetermined torsion angle via a relative-rotation restricting portion 96. The relative-rotation restricting portion 96 includes a rotor-shaft-side protruding portion 96a and a coupling-shaft-side protruding portion 96b. A plurality of the rotor-shaft-side protruding portions 96a is disposed at regular intervals along the circumferential direction on the inner peripheral surface of the rotor shaft 51. A plurality of the coupling-shaft-side protruding portions 96b is disposed at regular intervals along the circumferential direction on the outer peripheral surface of the coupling shaft 95. The rotor-shaft-side protruding portion 96a and the coupling-shaft-side protruding portion 96b both extend along the axial direction of the central axis line (equivalent to the rotation axis line X1 in the installation position). The coupling shaft 95 is inserted into the rotor shaft 51 such that the respective coupling-shaft-side protruding portions 96b positioned between the adjacent rotor-shaft-side protruding portions 96a in the circumferential direction. The rotor-shaft-side protruding portion 96a and the coupling-shaft-side protruding portion 96b have the gap corresponding to the allowed torsion angle in the circumferential direction in the state where the coupling shaft 95 is assembled within the rotor shaft 51. This gap is set such that this allowed torsion angle is larger than the above-described required range. The coupling shaft 95 has the other end having an end surface on which a cutout 95a is formed. The above-described holding member 93 has, on its opening 92d side, an end portion that is inserted into this cutout 95a so that the holding member 93 is coupled to the coupling shaft 95 to be integrally rotatable. Accordingly, the holding member 93 is coupled to the second sun gear S2 to be integrally rotatable around the rotation axis line X1 via the coupling shaft 95.

As illustrated in FIGS. 17 and 18, the elastic member 9 of this embodiment is constituted by a wave-shaped leaf spring. As illustrated in FIGS. 10 and 11, this elastic member 9 is arranged intervening between the inner surface of the sleeve 92 and the outer surface of the holding member 93. Here, the vehicle drive apparatus 1 includes two of the elastic members 9. The respective elastic members 9 in the state where the holding member 93 is housed within the housing space portion 92b of the sleeve 92 are each arranged between the bulge portion 92e of the sleeve 92 and the projecting portion 93a of the holding member 93 so as to be sandwiched by this bulge portion 92e and this projecting portion 93a.

As a result, the holding mechanism 91 has the configuration where the sleeve 92 and the holding member 93 are relatively rotatable in the circumferential direction within the range of a torsion angle that allows the required range corresponding to the output variation in the engine 3. Accordingly, the elastic member 9 held by the holding mechanism 91 allows coupling the rotor shaft 51 of the second rotary machine 5 and the Second sun gear S2 together to be relatively rotatable. The elastic member 9 sandwiched by the bulge portion 92e and this projecting portion 93a is held between the sleeve 92 and the holding member 93 and expands and contracts in association with the relative rotation between the rotor shaft 51, the sleeve 92 and the second sun gear S2, and the holding member 93 in response to the output variation in the engine 3, so as to allow receiving the variation component in the engine 3 as described above.

As described above, the MG control torque Tmg and the spring property of the elastic member 9 are set such that the minimum value Tbmin of the pressing-torque effective value Tb is ensured to have a magnitude that allows appropriately pressing the tooth surfaces in the respective engaging portions against one another in response to the output variation in the engine 3 and such that the maximum value Tbmax of the pressing-torque effective value Tb does not unnecessarily increase.

FIG. 19 illustrates the torsional property of the vehicle drive apparatus 1 on which the elastic member 9 is installed as described above. In FIG. 19, the horizontal axis denotes a torsion angle (in other words, a swing angle caused by the output variation in the engine 3) in the holding mechanism 91, and the vertical axis denotes a torque. In FIG. 19, a solid line L21 denotes the torsional property of the vehicle drive apparatus 1 of this embodiment, and a dotted line L22 denotes the torsional property of the vehicle drive apparatus without the elastic member 9 according to the comparative example. Similarly to the solid line L1 in FIG. 8, the solid line L21 denotes the torque (in other words, the pressing-torque effective value Tb) acting on the second sun gear S2 and the like via the elastic member 9 corresponding to the torsion angle in the state where the second rotary machine 5 outputs a torque based on the MG control torque Tmg. As apparent from the comparison between the solid line L21 and the dotted line L22, the vehicle drive apparatus 1 of this embodiment has the property where the pressing-torque effective value Tb smoothly changes corresponding to the spring property (spring constant) of the elastic member 9 in response to the change in torsion angle, in other words, the variation in swing angle caused by the output variation in the engine 3.

Here, the vehicle drive apparatus 1 may situationally change the MG control torque Tmg in a plurality of steps corresponding to the required range and the spring property of the elastic member 9 within the range where the minimum value Tbmin of the pressing-torque effective value Tb is ensured to have an appropriate magnitude and such that the maximum value Tbmax of the pressing-torque effective value Tb does not unnecessarily increase. FIG. 19 illustrates the case where the magnitude of the MG control torque Tmg can be changed to a first MG control torque Tmg1, a second MG control torque Tmg2, and a third MG control torque Tmg3 in three steps. In this case, the magnitude of the MG control torque Tmg increases in the order corresponding to the first MG control torque Tmg1, the second MG control torque Tmg2, and the third MG control torque Tmg3 (Tmg1<Tmg2<Tmg3). In FIG. 19, the maximum value Tbmax1 corresponds to the maximum value of the pressing-torque effective value Tb in the case where the second rotary machine 5 is controlled based on the first MG control torque Tmg1. The minimum value Tbmin1 corresponds to the minimum value of the pressing-torque effective value Tb in the case where the second rotary machine 5 is controlled based on the first MG control torque Tmg1. Similarly, the maximum value Tbmax2 corresponds to the maximum value of the pressing-torque effective value Tb in the case where the second rotary machine 5 is controlled based on the second MG control torque Tmg2. The minimum value Tbmin2 corresponds to the minimum value of the pressing-torque effective value Tb in the case where the second rotary machine 5 is controlled based on the second MG control torque Tmg2. The maximum value Tbmax3 corresponds to the maximum value of the pressing-torque effective value Tb in the case where the second rotary machine 5 is controlled based on the third MG control torque Tmg3. The minimum value Tbmin3 corresponds to the minimum value of the pressing-torque effective value Tb in the case where the second rotary machine 5 is controlled based on the third MG control torque Tmg3. At this time, the magnitude relationships of the maximum values and the minimum values of the pressing-torque effective value Tb are Tbmax1<Tbmax2<Tbmax3 and Tbmin1<Tbmin2<Tbmin3.

In this case, for example, depending on the situation of the vehicle 2, in the state where sound noise such as tooth hitting noise is relatively less likely to occur, the ECU 7 controls the torque output from the second rotary machine 5 based on the first MG control torque Tmg1 in the pre-torque control. For example, depending on the situation of the vehicle 2, in the state where sound noise such as tooth hitting noise is relatively likely to occur, the ECU 7 controls the torque output from the second rotary machine 5 based on the third MG control torque Tmg3. For example, in the intermediate state, which is neither of the above states, the ECU 7 controls the torque output from the second rotary machine 5 based on the second MG control torque Tmg2. Accordingly, the vehicle drive apparatus 1 allows increasing the MG control torque Tmg in phases as necessary. This allows suppressing the power consumption (energy consumption) as much as possible, thus improving the fuel efficiency performance. Here, the selective use of the MG control torque Tmg as described above will be described in detail in the embodiment below using an example.

In the vehicle drive apparatus 1 constituted as described above, the elastic member 9 couples the rotor shaft 51 of the second rotary machine 5 to the second sun gear S2 to be relatively rotatable. This allows the rotational elements (the second sun gear S2, the second carrier C2, the first ring gear R1, and the second ring gear R2) of the differential mechanism 62 to rapidly follow the motion on the engine 3 side, using the biasing force of the elastic member 9 as described above. As a result, the vehicle drive apparatus 1 allows the tooth surfaces in the respective engaging portions in the power transmission device 6 to preferably follow the output variation in the engine 3, thus suppressing the occurrence of the gaps (backlashes) in the engaging portions between the respective rotational elements. As a result, for example, in the case where a large output variation is caused by misfire in a cold state of the engine 3, the vehicle drive apparatus 1 also allows suppressing the occurrence of the gaps in the engaging portions between the respective rotational elements. This allows appropriately suppressing the rattling sound such as tooth hitting noise, thus suppressing the sound noise and the vibration.

In the vehicle drive apparatus 1, also when the pre-torque control relatively decreases the MG control torque Tmg so as to relatively decrease the pressing torque output from the second rotary machine 5, the action of the elastic member 9 as described above allows properly ensuring the follow-up responsivity of the pressing force actually acting on the respective engaging portions in the pre-torque control in response to the output variation in the engine 3. That is, in the vehicle drive apparatus 1, the action of the elastic member 9 does not cause the inertial mass of the second rotary machine 5 to directly act on the driving system such as the power transmission device 6. This allows controlling the motion of the rotational element of the power transmission device 6 using a relatively small torque. As a result, the vehicle drive apparatus 1 allows properly suppressing, for example, the occurrence of sound noise and vibration, so as to allow ensuring the compatibility between comfortable running performance and fuel efficiency performance in addition to the suppression of the increase in device size and the deterioration in fuel efficiency performance.

The vehicle drive apparatus 1 allows properly suppressing the occurrence of sound noise and vibration without an increase in pressing torque output from the second rotary machine 5 in the pre-torque control. This eliminates the need for, for example, activating the braking device of the vehicle 2 to brake the vehicle 2 so as to prevent the vehicle 2 from starting to move during the pre-torque control. Accordingly, the vehicle drive apparatus 1 allows suppressing the loss increase so as to suppress the deterioration in fuel efficiency performance. This allows improving the fuel efficiency performance also in this point.

In the vehicle drive apparatus 1, disposing the elastic member 9 within the rotor shaft 51 of the second rotary machine 5 allows ensuring a more compact configuration, thus improving the mountability.

The vehicle drive apparatus 1 according to the embodiment described above includes: the engine 3; the second rotary machine 5; the output member 61 coupled to the drive wheel 50 of the vehicle 2; the differential mechanism 62 coupling the engine 3, the second rotary machine 5, and the output member 61 together to be differentially rotatable via the plurality of differentially rotatable rotational elements; and the elastic member 9 coupling the rotor shaft 51 of the second rotary machine 5 to the rotational element (here, the second sun gear S2) of the differential mechanism 62 to be relatively rotatable. Accordingly, the vehicle drive apparatus 1 allows suppressing the occurrence of the gaps (backlashes) in the engaging portions between the respective rotational elements due to the biasing force of the elastic member 9. This allows suppressing the rattling sound such as tooth hitting noise so as to suppress the occurrence of sound noise and vibration.

Second Embodiment

Figure 20:
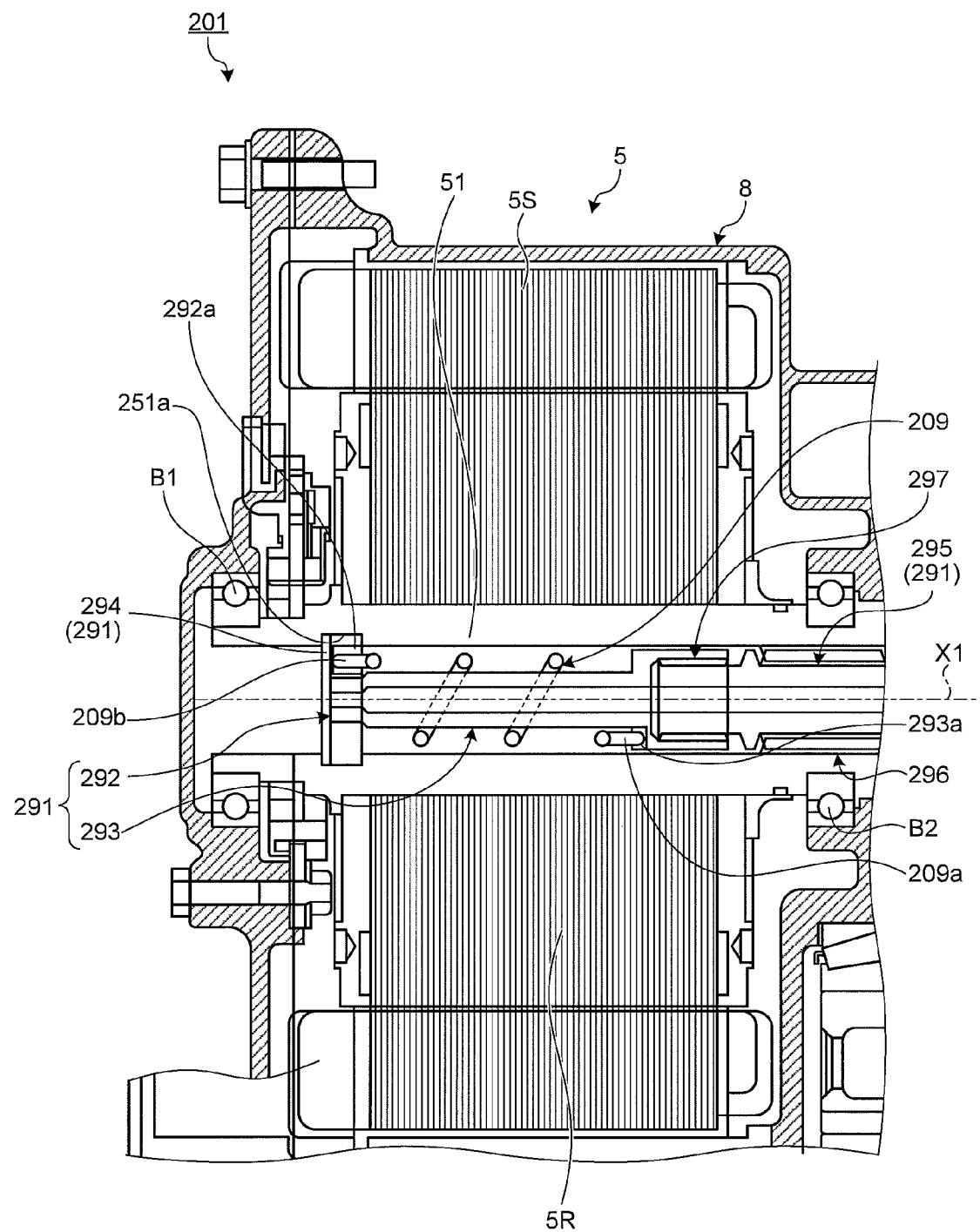
FIG. 20 is a partial cross-sectional view including the holding mechanism of the vehicle drive apparatus according to a second embodiment.

FIG. 20 is a partial cross-sectional view including a holding mechanism of a vehicle drive apparatus according to a second embodiment. The vehicle drive apparatus according to the second embodiment differs in the configuration of the holding mechanism from the first embodiment. In addition, the duplicate description of the configurations and the operation and effect in common with the above-described embodiment is omitted as much as possible (the same applies to the embodiments described below).

A vehicle drive apparatus 201 according to this embodiment illustrated in FIG. 20 includes a holding mechanism 291, and differs in the configuration of this holding mechanism 291 from the above-described holding mechanism 91 (see FIG. 10).

As illustrated in FIG. 20, the holding mechanism 291 of this embodiment is arranged on the inner peripheral surface side of the rotor shaft 51 and holds an elastic member 209 within this rotor shaft 51. The holding mechanism 291 of this embodiment includes a ring member 292 as the rotation-shaft-side rotating member and a holding shaft 293 as the rotational-element-side rotating member. The ring member 292 is disposed within the rotor shaft 51 and rotates integrally with this rotor shaft 51. The holding shaft 293 is disposed within the rotor shaft 51, and rotates integrally with the rotational element of the differential mechanism 62, here, the second sun gear S2 (see FIG. 1). The holding mechanism 291 holds the elastic member 209 between the ring member 292 and the holding shaft 293. In the holding mechanism 291, the ring member 292 and the holding shaft 293 are relatively rotatable in the circumferential direction within the range of the torsion angle that allows the required range corresponding to the output variation in the engine 3. In other words, the holding mechanism 291 holds the elastic member 209 between the ring member 292 and the holding shaft 293 such that the follow-up range (the allowable torsion angle) of the elastic member 209 becomes larger than the above-described required range. This allows the holding mechanism 291 to hold the elastic member 209 such that this elastic member 209 can properly expand and contract between the ring member 292 and the holding shaft 293 corresponding to the output variation in the engine 3. Here, the holding mechanism 291 further includes a snap ring 294, a coupling shaft 295, and the like.

Specifically, the ring member 292 is formed in a ring shape (annular shape). The ring member 292 has a protrusion fitted to a fitting groove 251a formed on the inner peripheral surface of the rotor shaft 51, and is positioned with respect to the axial direction of the rotor shaft 51 by the snap ring 294. As a result, the ring member 292 is secured to the rotor shaft 51 so as to be assembled to be rotatable integrally with the rotor shaft 51 around the rotation axis line X1. The ring member 292 has a rotation-shaft-side engaging groove 292a formed in a predetermined portion.

The holding shaft 293, which is formed in a rod shape, here, a columnar shape, has one end portion having a rotational-element-side engaging groove 293a. Here, the elastic member 209 of this embodiment is constituted by a coil spring, and allows insertion of this holding shaft 293 on its inner side. The holding shaft 293 is disposed within the rotor shaft 51 in the positional relationship where the other end portion without formation of the rotational-element-side engaging groove 293a is inserted on the inner peripheral side of the ring member 292 in the state where the elastic member 209 is mounted. That is, the above-described ring member 292 has the configuration that is formed on the other end portion side of the holding shaft 293 and has the rotation-shaft-side engaging groove 292a. In the elastic member 209, the coil spring has: one end 209a engaged with the rotational-element-side engaging groove 293a; and another end 209b engaged with the rotation-shaft-side engaging groove 292a. This allows the elastic member 209 to coupling the ring member 292 and the holding shaft 293 together to be circumferentially relatively rotatable. In the holding shaft 293, one end portion where the rotational-element-side engaging groove 293a is formed couples to the coupling shaft 295.

The coupling shaft 295, which is formed in a columnar shape, has one end integrally rotatably coupled to the second sun gear S2 (see FIG. 1). The coupling shaft 295 is assembled relatively rotatably to the rotor shaft 51 up to a predetermined torsion angle via a relative-rotation restricting portion 296. The relative-rotation restricting portion 296 has a configuration approximately similar to that of the above-described relative-rotation restricting portion 96 (see FIG. 10). The other end side of the coupling shaft 295 integrally rotatably couples to the holding shaft 293 via a coupling portion 297. The coupling portion 297 is constituted by a spline or the like, and couples the holding shaft 293 and the coupling shaft 295 together so as not to cause a gap (backlash) in the circumferential direction. Accordingly, the holding shaft 293 couples to the second sun gear S2 to be integrally rotatable around the rotation axis line X1 via the coupling shaft 295.

As a result, the holding mechanism 291 has the configuration where the ring member 292 and the holding shaft 293 are relatively rotatable in the circumferential direction within the range of the torsion angle that allows the required range corresponding to the output variation in the engine 3. This allows the elastic member 209 held by the holding mechanism 291 to couple the rotor shaft 51 of the second rotary machine 5 to the second sun gear S2 to be relatively rotatable. The elastic member 209 whose respective both ends are engaged with the rotation-shaft-side engaging groove 292a and the rotational-element-side engaging groove 293a is held between the ring member 292 and the holding shaft 293 and expands and contracts in association with the relative rotation between the rotor shaft 51, the ring member 292 and the second sun gear S2, and the holding shaft 293 in response to the output variation in the engine 3, so as to allow receiving the variation component in the engine 3 as described above. Accordingly, in the vehicle drive apparatus 201, disposing the elastic member 209 within the rotor shaft 51 of the second rotary machine 5 allows ensuring a more compact configuration, thus improving the mountability. Here, the torsional property of the vehicle drive apparatus 201 of this embodiment has a property approximately equivalent to the property exemplified in FIG. 19.

The vehicle drive apparatus 201 according to the embodiment described above allows suppressing the occurrence of the gaps (backlashes) in the engaging portions between the respective rotational elements, using the biasing force of the elastic member 209. This allows suppressing the rattling sound such as tooth hitting noise so as to suppress the occurrence of sound noise and vibration.

Third Embodiment

Figure 21:
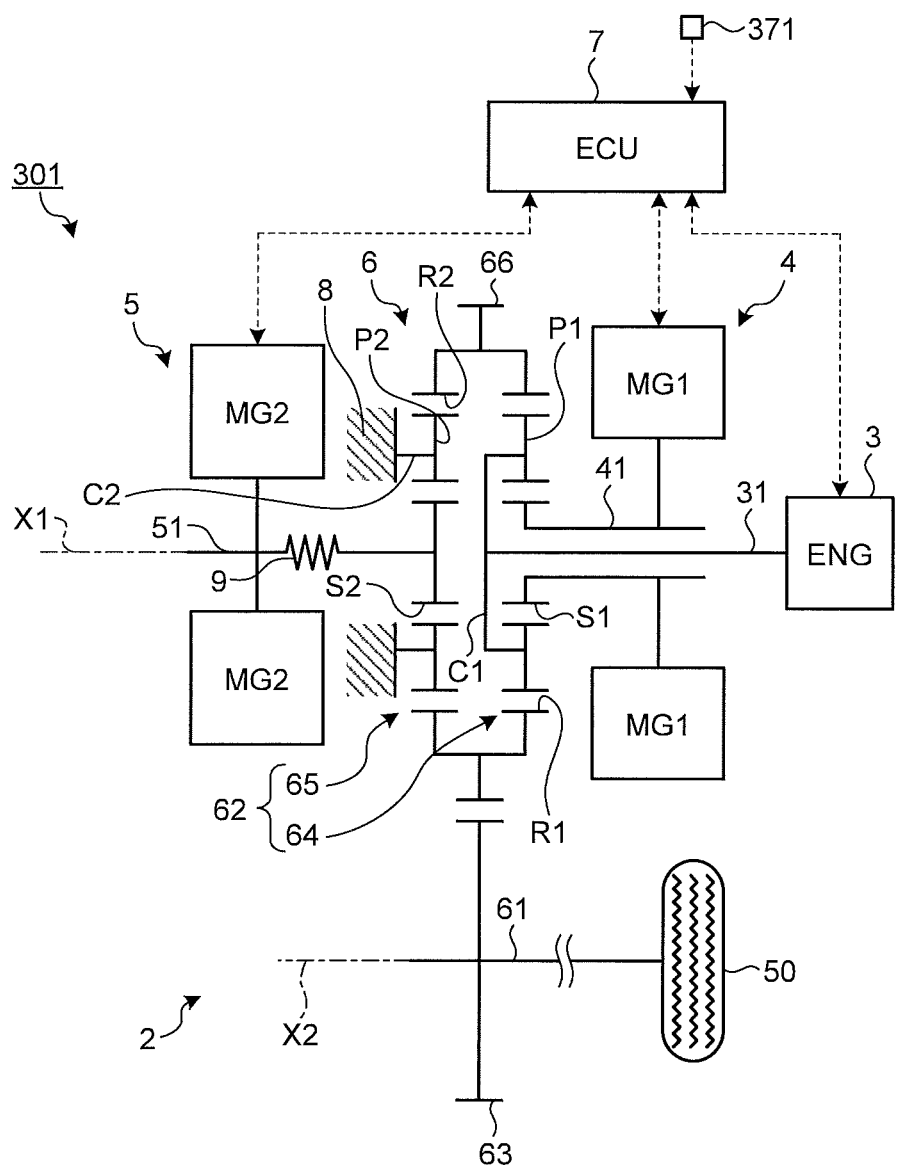
FIG. 21 is a schematic configuration diagram of a vehicle equipped with a vehicle drive apparatus according to a third embodiment.
Figure 22:
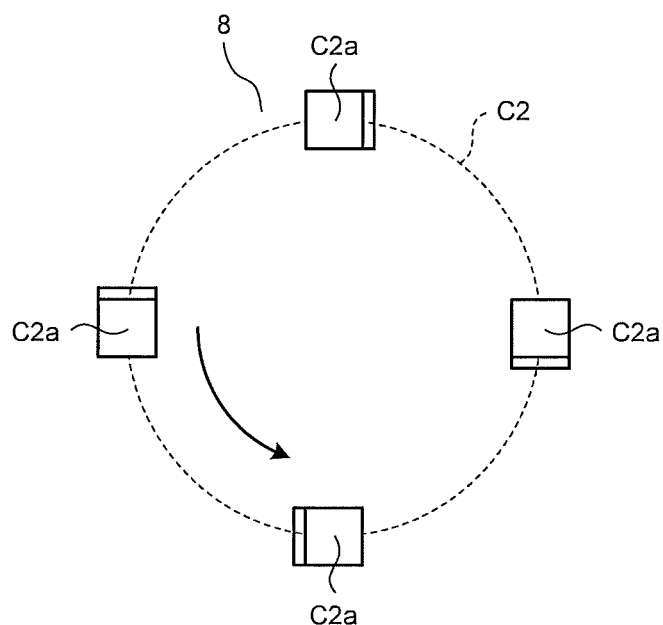
FIG. 22 is a schematic diagram describing an installation example of a hitting-sound detecting device of the vehicle drive apparatus according to the third embodiment.
Figure 23:
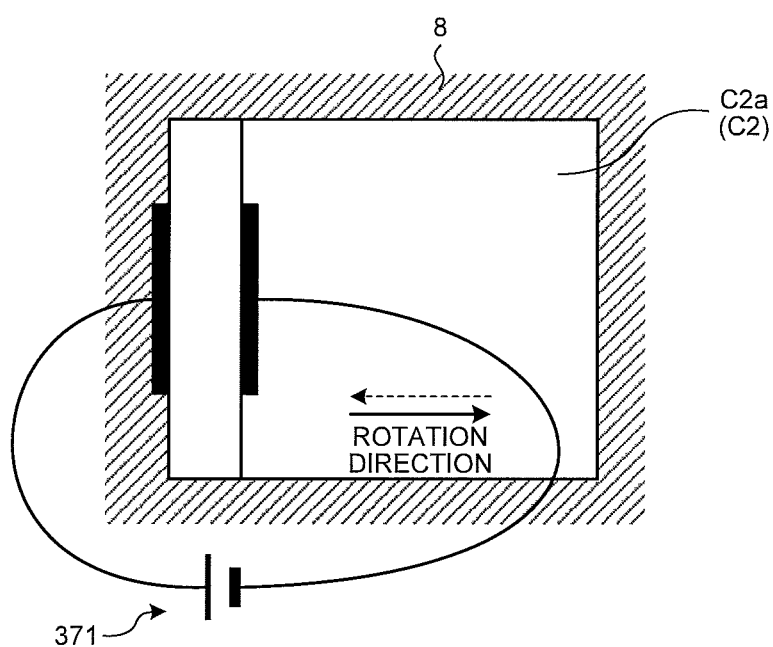
FIG. 23 is a schematic diagram describing a configuration example of the hitting-sound detecting device of the vehicle drive apparatus according to the third embodiment.

FIG. 21 is a schematic configuration diagram of a vehicle equipped with a vehicle drive apparatus according to a third embodiment. FIG. 22 is a schematic diagram describing an installation example of a hitting-sound detecting device of the vehicle drive apparatus according to the third embodiment. FIG. 23 is a schematic diagram describing a configuration example of the hitting-sound detecting device of the vehicle drive apparatus according to the third embodiment. The vehicle drive apparatus according to the third embodiment differs from the first and second embodiments in that the magnitude of the pressing torque output from the rotary machine is set to be variable depending on the situation.

The ECU 7 of a vehicle drive apparatus 301 according to this embodiment illustrated in FIG. 21 situationally changes the MG control torque Tmg in a plurality of steps in the pre-torque control so as to change the pressing torque output from the second rotary machine 5 in a plurality of steps as described also in FIG. 19 above. The vehicle drive apparatus 301 of this embodiment includes a hitting-sound detecting device 371. The ECU 7 changes the MG control torque Tmg based on the detection result by this hitting-sound detecting device 371, so as to change the pressing torque output from the second rotary machine 5.

The hitting-sound detecting device 371 detects the occurrence of hitting sound (rattling sound such as tooth hitting noise) in the engaging portions between the plurality of rotational elements in the differential mechanism 62. The hitting-sound detecting device 371 of this embodiment detects hitting sound in the engaging portions between the respective rotational elements based on the reactive force generated between: the rotational element secured to the casing 8 as the fixed portion, here, the second carrier C2; and this casing 8.

Here, as exemplified in FIG. 22, the second carrier C2 is secured to the casing 8 via the fixed shaft C2$a$. In the case where hitting sound occurs due to the occurrence of the gaps (backlashes) in the engaging portions between the respective rotational elements, the vehicle drive apparatus 301 tends to have a relatively large reactive force (the force in the opposite direction to the pressing force given by the second rotary machine 5) occurring between the fixed shaft C2$a$ of the second carrier C2 and the casing 8. The hitting-sound detecting device 371 of this embodiment is disposed in the coupling part between the casing 8 and the fixed shaft C2$a$, employs a gap sensor that detects the gap (the gap in the direction around the rotation axis line X1), which is narrowed by this reactive force, between the casing 8 and the fixed shaft C2$a$. The hitting-sound detecting device 371 detects this gap so as to detect the occurrence of hitting sound.

The hitting-sound detecting device 371 can employ, for example, various types such as a capacitance type gap sensor and a piezoelectric type gap sensor. For example, as exemplified in FIG. 23, the hitting-sound detecting device 371 includes electrodes in both the casing 8 and the fixed shaft C2$a$, and detects the existence of the gap between the casing 8 and the fixed shaft C2$a$ based on the energized/non-energized states of these electrodes. The hitting-sound detecting device 371 transitions from the non-energized state to the energized state when, for example, the rotation direction of the second carrier C2 changes from the solid arrow direction (the state having the pressing action by the pressing torque of the second rotary machine 5) in the drawing to the dotted arrow direction (the state without the pressing action by the pressing torque of the second rotary machine 5) in the drawing, the gap between the casing 8 and the fixed shaft C2$a$ disappears, and the respective electrodes are in the contact state. Using this mechanism, the hitting-sound detecting device 371 transitions from the non-energized state to the energized state so as to allow detecting the change from the state having the pressing action by the pressing torque of the second rotary machine 5 to the state without the pressing action by the pressing torque of the second rotary machine 5, that is, the state where gaps (backlashes) occur in the engaging portions between the respective rotational elements. This allows the hitting-sound detecting device 371 to detect the occurrence of hitting sound. Here, the hitting-sound detecting device 371 is disposed in the position of the fixed shaft C2$a$ of the second carrier C2 via the pair of gears (the second sun gear S2 and the pinion gear P2 held by the second carrier C2) from the second rotary machine 5. Thus, the hitting-sound detecting device 371 allows detecting hitting sound in the case where this hitting sound occurs in the engaging portions between the respective rotational elements intervening between this installation position and the engine 3.

In the case where this hitting-sound detecting device 371 detects the occurrence of hitting sound, the ECU 7 increases the MG control torque Tmg so as to increase the pressing torque output from the second rotary machine 5.

For example, as described above using FIG. 19, in the case where the magnitude of the MG control torque Tmg can be changed in three steps of the first MG control torque Tmg1, the second MG control torque Tmg2, and the third MG control torque Tmg3 (Tmg1<Tmg2<Tmg3), the ECU 7 firstly controls the second rotary machine 5 based on the first MG control torque Tmg1 to execute the pre-torque control.

When the hitting-sound detecting device 371 does not detect the occurrence of hitting sound, the ECU 7 continues the pre-torque control based on the first MG control torque Tmg1 as it is. On the other hand, in the case where the hitting-sound detecting device 371 detects the occurrence of hitting sound, the ECU 7 changes the MG control torque Tmg from the first MG control torque Tmg1 to the second MG control torque Tmg2, which is the next upper step, and controls the second rotary machine 5 based on the second MG control torque Tmg2 to execute the pre-torque control.

Then, in the state where the hitting-sound detecting device 371 does not detect the occurrence of hitting sound, the ECU 7 continues the pre-torque control based on the second MG control torque Tmg2 as it is. On the other hand, in the case where the hitting-sound detecting device 371 continuously detects the occurrence of hitting sound, the ECU 7 changes the MG control torque Tmg from the second MG control torque Tmg2 to the third MG control torque Tmg3, which is the next upper step, and controls the second rotary machine 5 based on the third MG control torque Tmg3 to execute the pre-torque control.

The ECU 7 may reduce the MG control torque Tmg to the next lower step in the case where a predetermined period, which is preliminarily set, has passed in the state where the hitting-sound detecting device 371 does not detect the occurrence of hitting sound during execution of the pre-torque control based on the second MG control torque Tmg2 or the third MG control torque Tmg3.

Accordingly, the vehicle drive apparatus 301 allows increasing and decreasing the MG control torque Tmg corresponding to the existence of the occurrence of hitting sound, and thus allows relatively decreasing the torque output from the second rotary machine 5 in the pre-torque control so as to suppress the power consumption (energy consumption) as much as possible. This allows improving the fuel efficiency performance in addition to the suppression in sound noise.

The vehicle drive apparatus 301 according to the embodiment described above allows suppressing the occurrence of the gaps (backlashes) in the engaging portions between the respective rotational elements, using the biasing force of the elastic member 9. This allows suppressing the rattling sound such as tooth hitting noise so as to suppress the occurrence of sound noise and vibration.

Furthermore, the vehicle drive apparatus 301 according to the embodiment described above includes the hitting-sound detecting device 371, which detects the occurrence of hitting sound in the engaging portions between the plurality of rotational elements, and the ECU 7 changes the pressing torque in the pre-torque control based on the detection result by the hitting-sound detecting device 371. Accordingly, the vehicle drive apparatus 301 allows improving the fuel efficiency performance in addition to the suppression in sound noise.

Fourth Embodiment

Figure 24:
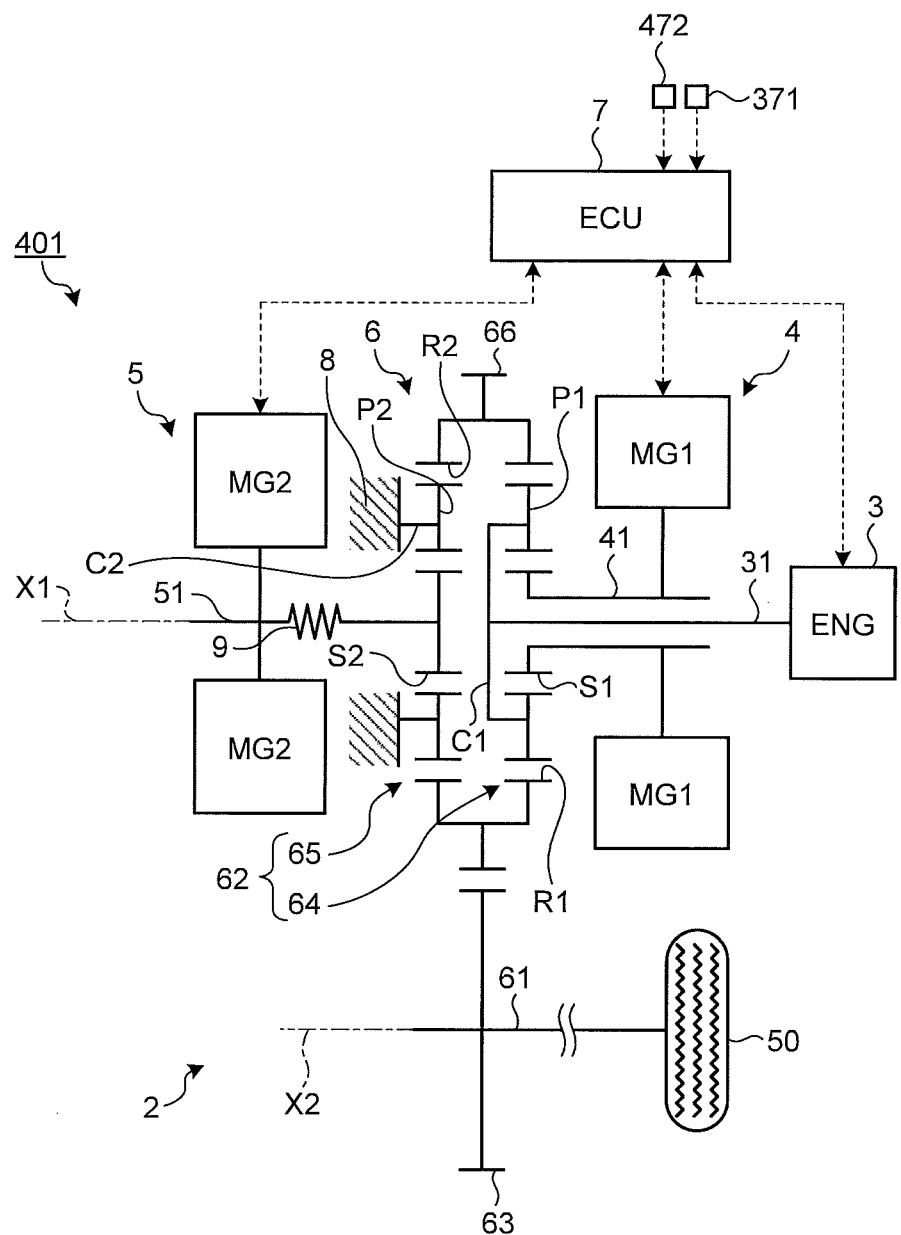
FIG. 24 is a schematic configuration diagram of a vehicle equipped with a vehicle drive apparatus according to a fourth embodiment.
Figure 25:
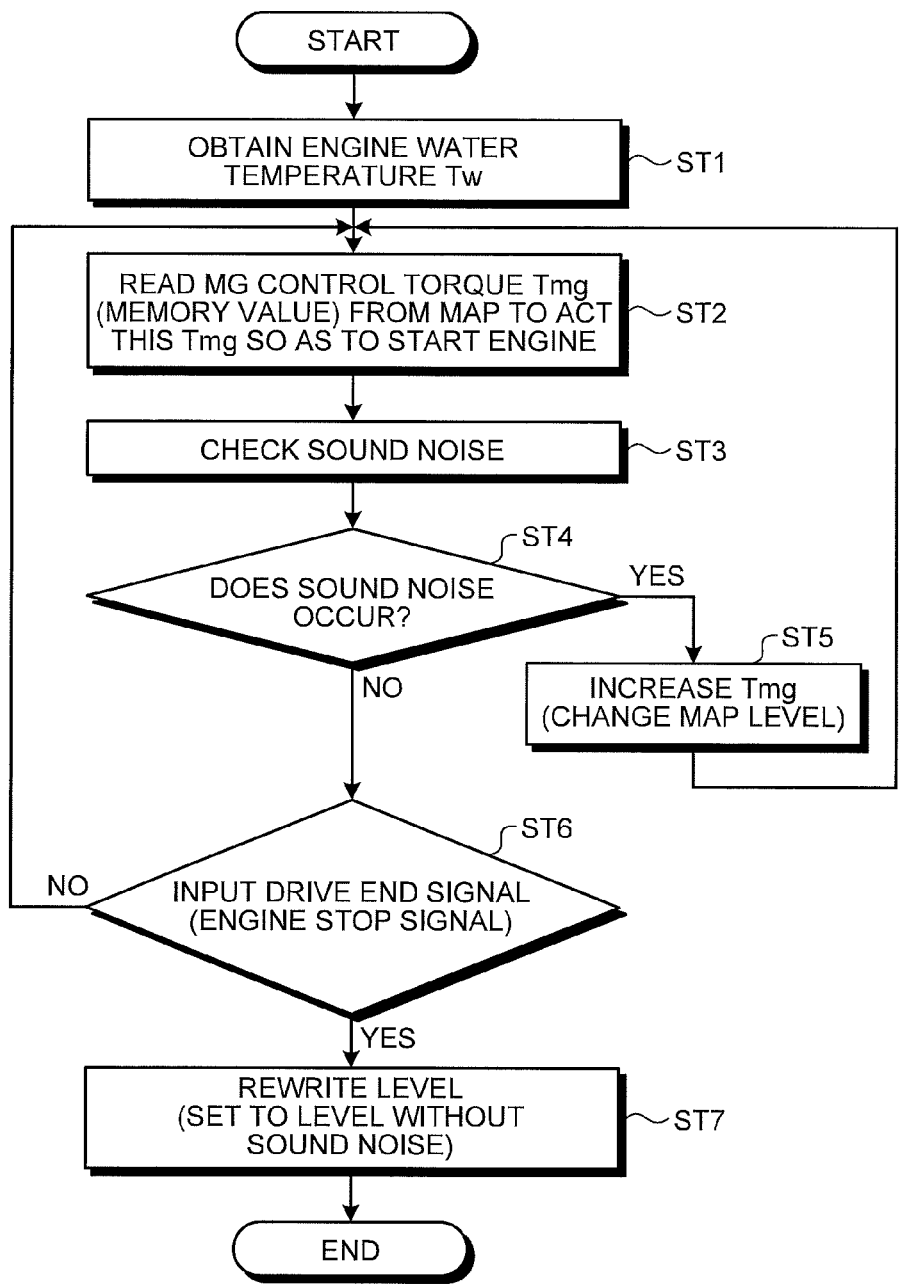
FIG. 25 is a flowchart describing one example of a control in the vehicle drive apparatus according to the fourth embodiment.
Figure 26:
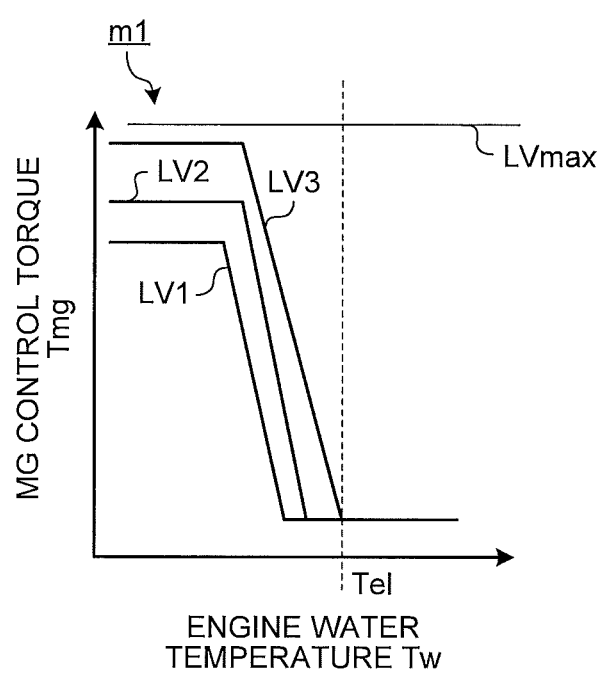
FIG. 26 is a graph representing one example of a pre-torque-control map in a vehicle drive apparatus according to a fourth embodiment.

FIG. 24 is a schematic configuration diagram of a vehicle equipped with a vehicle drive apparatus according to a fourth embodiment. FIG. 25 is a flowchart describing one example of the control in the vehicle drive apparatus according to the fourth embodiment. FIG. 26 is a graph representing one example of the pre-torque-control map in the vehicle drive apparatus according to the fourth embodiment. The vehicle drive apparatus according to the fourth embodiment differs from the third embodiment in that the magnitude of the pressing torque output from the rotary machine is set to be variable corresponding to a cooling medium for cooling the engine.

As also described in FIG. 19 above, the ECU 7 of a vehicle drive apparatus 401 according to this embodiment illustrated in FIG. 24 situationally changes the MG control torque Tmg in the pre-torque control in a plurality of steps so as to change the pressing torque output from the second rotary machine 5 in a plurality of steps. The vehicle drive apparatus 401 of this embodiment further includes a temperature detecting device 472 in addition to the hitting-sound detecting device 371. The ECU 7 changes the MG control torque Tmg further based on the detection result by the temperature detecting device 472 in addition to the detection result by the hitting-sound detecting device 371, so as to change the pressing torque output from the second rotary machine 5.

The temperature detecting device 472 detects the temperature (hereinafter sometimes referred to as an "engine water temperature") of the cooling water as the cooling medium for cooling the engine 3.

Here, the vehicle drive apparatus 401 tends to be likely to have a large output variation caused by, for example, misfire in the cold state of the engine 3, and tends to be likely to cause sound noise such as tooth hitting noise in this case. On the other hand, the vehicle drive apparatus 401 tends to be less likely to have a large output variation because sufficient warming-up of the engine 3 is less likely to cause misfire, and tends to less likely to cause sound noise such as tooth hitting noise in this case.

Accordingly, here, the ECU 7 changes the MG control torque Tmg based on the engine water temperature detected by the temperature detecting device 472 so as to change the pressing torque output from the second rotary machine 5. This allows the ECU 7 to selectively use the MG control torque Tmg corresponding to the likelihood of occurrence of sound noise such as tooth hitting noise.

For example, in the case where the engine water temperature detected by the temperature detecting device 472 is higher than a specified value, which is preliminarily set, the ECU 7 sets the magnitude of the MG control torque Tmg to a relatively small value (for example, the first MG control torque Tmg1 in FIG. 19) so as to relatively decrease the pressing torque output from the second rotary machine 5. Here, the specified value is a threshold value set to the engine water temperature to determine the cold state of the engine 3, and is, for example, preliminarily set corresponding to the real vehicle evaluation or the like. Accordingly, the ECU 7 allows relatively decreasing the torque output from the second rotary machine 5 in the pre-torque control in the state where the engine 3 is sufficiently warmed up and sound noise such as tooth hitting noise is less likely to occur, so as to improve the fuel efficiency performance.

On the other hand, for example, in the case where the engine water temperature detected by the temperature detecting device 472 is equal to or less than the preliminarily set specified value, the ECU 7 sets the magnitude of the MG control torque Tmg to a relatively large value (for example, the third MG control torque Tmg3 in FIG. 19) so as to relatively increase the pressing torque output from the second rotary machine 5. Accordingly, in the state where the engine 3 is in the cold state and sound noise such as tooth hitting noise is likely to occur, the ECU 7 allows relatively increasing the torque output from the second rotary machine 5 in the pre-torque control so as to reliably suppress the sound noise.

This allows the vehicle drive apparatus 401 to increase and decrease the MG control torque Tmg corresponding to: the state where sound noise such as tooth hitting noise is likely to occur; and the state where sound noise is less likely to occur, based on the engine water temperature. As a result, the vehicle drive apparatus 401 allows relatively decreasing the torque output from the second rotary machine 5 in the pre-torque control so as to suppress the power consumption (energy consumption) as much as possible. This allows improving the fuel efficiency performance in addition to the suppression in sound noise.

The ECU 7 may set the magnitude of the MG control torque Tmg to a relatively small value (for example, the second MG control torque Tmg2 in FIG. 19) so as to reduce the pressing torque output from the second rotary machine 5 insofar as the hitting-sound detecting device 371 does not detect the occurrence of hitting sound in the state where the torque output from the second rotary machine 5 is relatively increased by the pre-torque control. At this time, in the case where the hitting-sound detecting device 371 detects the occurrence of hitting sound while the magnitude of the MG control torque Tmg is set to a relatively small value, the ECU 7 may reset the magnitude of the MG control torque Tmg to the magnitude (the third MG control torque Tmg3) before the change so as to continue the pre-torque control as it is until the engine 3 warms up sufficiently. Subsequently, after the engine 3 warms up sufficiently, the ECU 7 may set the magnitude of the MG control torque Tmg to a relatively small value so as to reduce the pressing torque output from the second rotary machine 5.

The following describes one example of the control by the ECU 7 with reference to the flowchart in FIG. 25.

Firstly, IG-ON causes the ECU 7 to obtain an engine water temperature Tw based on the detection result by the temperature detecting device 472 (in step ST1).

Subsequently, the ECU 7 reads the MG control torque Tmg (the memory value) from a control map (or a mathematical model corresponding to this map) based on the engine water temperature Tw obtained in step ST1, and controls the second rotary machine 5 based on this MG control torque Tmg so as to start the engine 3 (in step ST2). For example, the ECU 7 computes the MG control torque Tmg from the engine water temperature Tw based on a control map m1 as exemplified in FIG. 26.

Here, in the control map m1, the horizontal axis denotes the engine water temperature Tw, and the vertical axis denotes the MG control torque Tmg. The control map m1 describes the relationship between the engine water temperature Tw and the MG control torque Tmg. The control map m1 is stored in the storage unit of the ECU 7 while the relationship between the engine water temperature Tw and the MG control torque Tmg is preliminarily set to the control map m1 based on the real vehicle evaluation and the like. The control map m1 exemplified in FIG. 26 specifies the relationships between the engine water temperature Tw and the MG control torque Tmg at a plurality of levels, here, for each of levels LV1, LV2, LV3, and LVmax. The MG control torque Tmg is basically set to increase in the order corresponding to the level LV1, the level LV2, the level LV3, and the level LVmax. Specifically, the MG control torque Tmg is set to be a relatively small constant value in the region where the engine water temperature Tw is higher than a preliminarily set specified value Tel at the levels LV1, LV2, and LV3. Furthermore, the MG control torque Tmg is set to:

gradually increase in association with reduction of the engine water temperature Tw and becomes constant at a predetermined temperature in the region where the engine water temperature Tw is equal to or less than the specified value Te1 at the levels LV1, LV2, and LV3; and relatively increase in the order corresponding to the level LV1, the level LV2, and the level LV3. The MG control torque Tmg is set to be a relatively large constant value at the level LVmax. The ECU 7 computes the MG control torque Tmg from the current level and the engine water temperature Tw based on the control map m1. Here, for example, the initial value of the level is set to the level LV1.

Subsequently, the ECU 7 checks the occurrence of sound noise such as hitting sound based on the detection result by the hitting-sound detecting device 371 (in step ST3), and determines whether sound noise occurs (in step ST4).

In the case where the ECU 7 determines that sound noise occurs (Yes in step ST4), the ECU 7 changes the level of the control map m1 so as to increase the MG control torque Tmg (in step ST5). Then, the ECU 7 causes the process to proceed to step ST2 so as to repeatedly execute the subsequent processes. In this case, the ECU 7 sets the level LV2 in the case where the current level is the level LV1, set the level LV3 in the case where the current level is the level LV2, and sets the level LVmax in the case where the current level is the level LV3.

In the case where the ECU 7 determines that sound noise does not occur (No in step ST4), the ECU 7 determines whether a drive end signal (engine stop signal) is input (in step ST6).

In the case where the ECU 7 determines that the drive end signal (engine stop signal) is not input (No in step ST6), the ECU 7 causes the process to proceed to step ST2 so as to repeatedly execute the subsequent processes.

In the case where the ECU 7 determines that the drive end signal (engine stop signal) is input (Yes in step ST6), the ECU 7 rewrites the level of the control map m1 corresponding to the existence of the occurrence of sound noise (in step ST7) and terminates this control. For example, in the case where the ECU 7 determines that sound noise occurs in step ST4, the ECU 7 learns the level at which this sound noise disappears in response to the process in step ST5 and the like. Then, the ECU 7 rewrites the relationship between the cooling water temperature Tw, the MG control torque Tmg, and the respective levels in the control map m1 corresponding to this learning, so as to use this relationship in the subsequent drive.

The vehicle drive apparatus 401 according to the embodiment described above allows suppressing the occurrence of the gaps (backlashes) in the engaging portions between the respective rotational elements, using the biasing force of the elastic member 9. This allows suppressing the rattling sound such as tooth hitting noise so as to suppress the occurrence of sound noise and vibration.

Furthermore, the vehicle drive apparatus 401 according to the embodiment described above includes the temperature detecting device 472, which detects the temperature of the cooling medium for cooling the engine 3. The ECU 7 changes the pressing torque in the pre-torque control based on the detected temperature of the cooling medium by the temperature detecting device 472. Accordingly, the vehicle drive apparatus 401 allows improving the fuel efficiency performance in addition to the suppression in sound noise.

Here, the above-described vehicle drive apparatuses according to the embodiments of the present invention are not limited to the above-described embodiments. Various modifications are possible within the scope described in the claims. The vehicle drive apparatus according to this embodiment may be configured by combining the components in the respective embodiments described above as necessary.

While in the above description the control device of the vehicle drive apparatus doubles as the ECU 7, this should not be construed in a limiting sense. For example, the control device of the vehicle drive apparatus may be constituted separately from the ECU 7, and these members may be configured to transmit and receive information such as a detection signal, a drive signal, and a control command to/from each other.

The differential mechanism described above includes the first planetary gear mechanism and the second planetary gear mechanism, but is not limited to this. The differential mechanism may include only one planetary gear mechanism or three or more planetary gear mechanisms.

The vehicle drive apparatus described above may employ an elastic member for the rotor shaft 41 of the first rotary machine 4 as described above. Also in this case, the vehicle drive apparatus allows suppressing the rattling sound such as tooth hitting noise so as to suppress the occurrence of sound noise and vibration.

As described above, the vehicle drive apparatus allows the respective rotational elements of the differential mechanism to follow the motion on the engine side using the biasing force of the elastic member also in the case where the MG control torque Tmg is zero, that is, in the case where the pre-torque control is not performed. This allows suppressing the occurrence of sound noise and vibration.

In the above description, the hitting-sound detecting device is the gap sensor, but is not limited to this. The hitting-sound detecting device only need to detect the occurrence of hitting sound in the engaging portions between a plurality of rotational elements.

REFERENCE SIGNS LIST 1, 201, 301, 401 Vehicle drive apparatus
2 Vehicle
3 Engine
4 First rotary machine
5 Second rotary machine
6 Power transmission device
7 ECU (control device)
8 Casing
9, 209 Elastic member
41, 51 Rotor shaft (rotation shaft)
50 Drive wheel
61 Output member
62 Differential mechanism
64 First planetary gear mechanism
65 Second planetary gear mechanism
92 Sleeve (rotation-shaft-side rotating member)
91, 291 Holding mechanism
93 Holding member (rotational-element-side rotating member)
94 Key member
95, 295 Coupling shaft
96, 296 Relative-rotation restricting portion
292 Ring member (rotation-shaft-side rotating member)
292a Rotation-shaft-side engaging groove
293 Holding shaft (rotational-element-side rotating member)
293a Rotational-element-side engaging groove
294 Snap ring
297 Coupling portion 371 Hitting-sound detecting device
472 Temperature detecting device
C1 First carrier
C2 Second carrier
C2a Fixed shaft
P1, P2 Pinion gear
R1 First ring gear
R2 Second ring gear
S1 First sun gear

The invention claimed is:

1. A vehicle drive apparatus, comprising:
an engine;
a rotary machine;
an output member coupled to a drive wheel of a vehicle;
a differential mechanism configured to couple the engine, the rotary machine, and the output member together to be differentially rotatable via a plurality of differentially rotatable rotational elements;
an elastic member configured to couple a rotation shaft of the rotary machine to the rotational element of the differential mechanism to be relatively rotatable;
a control device configured to execute a torque control that controls the rotary machine to cause the rotary machine to output a pressing torque reducing a gap in an engaging portion between the plurality of rotational elements, and
a holding mechanism including:
a rotation-shaft-side rotating member disposed within the rotation shaft of the rotary machine and configured to rotate integrally with the rotation shaft; and
a rotational-element-side rotating member disposed within the rotation shaft of the rotary machine and configured to rotate integrally with the rotational element of the differential mechanism, the holding mechanism holding the elastic member between the rotation-shaft-side rotating member and the rotational-element-side rotating member, the rotation-shaft-side rotating member and the rotational-element-side rotating member being relatively rotatable within a range of a torsion angle that allows a required range corresponding to an output variation in the engine, wherein
the holding mechanism includes a coupling shaft disposed within the rotation shaft of the rotary machine and configured to rotate integrally with the rotational-element-side rotating member,
the rotational-element-side rotating member is configured to rotate integrally with the rotational element of the differential mechanism via the coupling shaft,
the coupling shaft is configured to:
rotate integrally with the rotation shaft of the rotary machine; and
be relatively rotatable up to a predetermined torsion angle with respect to the rotation shaft, and
the predetermined torsion angle is set to be larger than the required range.

2. The vehicle drive apparatus according to claim 1, wherein
the elastic member is disposed within the rotation shaft of the rotary machine.

3. The vehicle drive apparatus according to claim 1, wherein
the rotation-shaft-side rotating member is formed in a pipe shape,
the rotational-element-side rotating member is formed in a plate shape and is inserted into the rotation-shaft-side rotating member, and
the elastic member is constituted by a wave-shaped leaf spring and is interposed between an inner surface of the rotation-shaft-side rotating member and an outer surface of the rotational-element-side rotating member.

4. The vehicle drive apparatus according to claim 1, wherein
the rotational-element-side rotating member is formed in a rod shape and includes one end portion having a rotational-element-side engaging groove,
the rotation-shaft-side rotating member is formed on another end portion side of the rotational-element-side rotating member and includes a rotation-shaft-side engaging groove, and
the elastic member is constituted by a coil spring and is configured to allow insertion of the rotational-element-side rotating member on an inner side of the elastic member, and the elastic member includes one end engaged with the rotational-element-side engaging groove and another end engaged with the rotation-shaft-side engaging groove.

5. The vehicle drive apparatus according to claim 1, further comprising
a tooth hitting noise detecting device configured to detect occurrence of rattling in the engaging portion between the plurality of rotational elements, wherein
the control device is configured to change the pressing torque based on a detection result by the tooth hitting noise detecting device.

6. The vehicle drive apparatus according to claim 1, further comprising
a temperature detecting device configured to detect a temperature of a cooling medium for cooling the engine, wherein
the control device is configured to change the pressing torque based on a detected temperature of the cooling medium by the temperature detecting device.

7. The vehicle drive apparatus according to claim 1, wherein
the differential mechanism includes a first planetary gear mechanism and a second planetary gear mechanism, and
the rotary machine couples to the engine via the first planetary gear mechanism and the second planetary gear mechanism and receives a reactive force of a rotating power generated by the engine when the rotating power of the engine transmits to the drive wheel.

8. The vehicle drive apparatus according to claim 2, further comprising
a holding mechanism including:
a rotation-shaft-side rotating member disposed within the rotation shaft of the rotary machine and configured to rotate integrally with the rotation shaft; and
a rotational-element-side rotating member disposed within the rotation shaft of the rotary machine and configured to rotate integrally with the rotational element of the differential mechanism, the holding mechanism holding the elastic member between the rotation-shaft-side rotating member and the rotational-element-side rotating member, the rotation-shaft-side rotating member and the rotational-element-side rotating member being relatively rotatable within a range of a torsion angle that allows a required range corresponding to an output variation in the engine.

9. The vehicle drive apparatus according to claim 8, wherein the rotation-shaft-side rotating member is formed in a pipe shape, the rotational-element-side rotating member is formed in a plate shape and is inserted into the rotation-shaft-side rotating member, and the elastic member is constituted by a wave-shaped leaf spring and is interposed between an inner surface of the rotation-shaft-side rotating member and an outer surface of the rotational-element-side rotating member.

10. The vehicle drive apparatus according to claim 8, wherein the rotational-element-side rotating member is formed in a rod shape and includes one end portion having a rotational-element-side engaging groove, the rotation-shaft-side rotating member is formed on another end portion side of the rotational-element-side rotating member and includes a rotation-shaft-side engaging groove, and the elastic member is constituted by a coil spring and is configured to allow insertion of the rotational-element-side rotating member on an inner side of the elastic member, and the elastic member includes one end engaged with the rotational-element-side engaging groove and another end engaged with the rotation-shaft-side engaging groove.

11. The vehicle drive apparatus according to claim 5, further comprising a temperature detecting device configured to detect a temperature of a cooling medium for cooling the engine, wherein the control device is configured to change the pressing torque based on a detected temperature of the cooling medium by the temperature detecting device.

12. The vehicle drive apparatus according to claim 5, wherein the holding mechanism includes a coupling shaft disposed within the rotation shaft of the rotary machine and configured to rotate integrally with the rotational element-side rotating member, the rotational-element-side rotating member is configured to rotate integrally with the rotational element of the differential mechanism via the coupling shaft, the coupling shaft is configured to:

rotate integrally with the rotation shaft of the rotary machine; and be relatively rotatable up to a predetermined torsion angle with respect to the rotation shaft, and the predetermined torsion angle is set to be larger than the required range.

\* \* \* \* \*